(12) United States Patent
Abraham et al.

(10) Patent No.: US 12,487,928 B2
(45) Date of Patent: Dec. 2, 2025

(54) TWO-STAGE CACHE PARTITIONING

(71) Applicant: Intel Corporation, Santa Clara, CA (US)

(72) Inventors: Philip Abraham, Beaverton, OR (US); Stephen Van Doren, Portland, OR (US); Ritu Gupta, Cuppertino, CA (US); Andrew Herdrich, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 17/711,471

(22) Filed: Apr. 1, 2022

(65) Prior Publication Data
US 2023/0315632 A1 Oct. 5, 2023

(51) Int. Cl.
*G06F 12/08* (2016.01)
*G06F 12/0811* (2016.01)
*G06F 12/084* (2016.01)
*G06F 12/0846* (2016.01)

(52) U.S. Cl.
CPC ........ *G06F 12/0811* (2013.01); *G06F 12/084* (2013.01); *G06F 12/0846* (2013.01)

(58) Field of Classification Search
CPC ............... G06F 12/0811; G06F 12/084; G06F 12/0846; G06F 12/0855; G06F 12/0895; G06F 2212/1016; G06F 2212/1041; G06F 12/0864

USPC ........................................ 711/122
See application file for complete search history.

(56) References Cited

U.S. PATENT DOCUMENTS 11,604,733 B1 * 3/2023 Krueger .............. G06F 12/0864
2018/0373635 A1 * 12/2018 Mukherjee .......... G06F 12/0864

* cited by examiner

*Primary Examiner* — Hua J Song
(74) *Attorney, Agent, or Firm* — Essential Patents Group, LLP

(57) ABSTRACT

Techniques and mechanisms to facilitate access to a cache based on a dual basis partition scheme. In an embodiment, a first one or more registers of a processor provide information which describes multiple set-wise partitions of a cache. A second one or more registers of the processor provides additional information which describes multiple way-wise partitions of the cache. A virtual cache is defined as that region of the cache which is both in a particular set-wise partition, and in a particular way-wise partition. In another embodiment, a cache agent of the processor performs operations, based on the set-wise partitioning and the way-wise partitioning, to determine a mapping of one address—which is provided in a memory access request, and which indicates a location in one virtual cache—to another address which indicates another location in a different virtual cache.

17 Claims, 17 Drawing Sheets

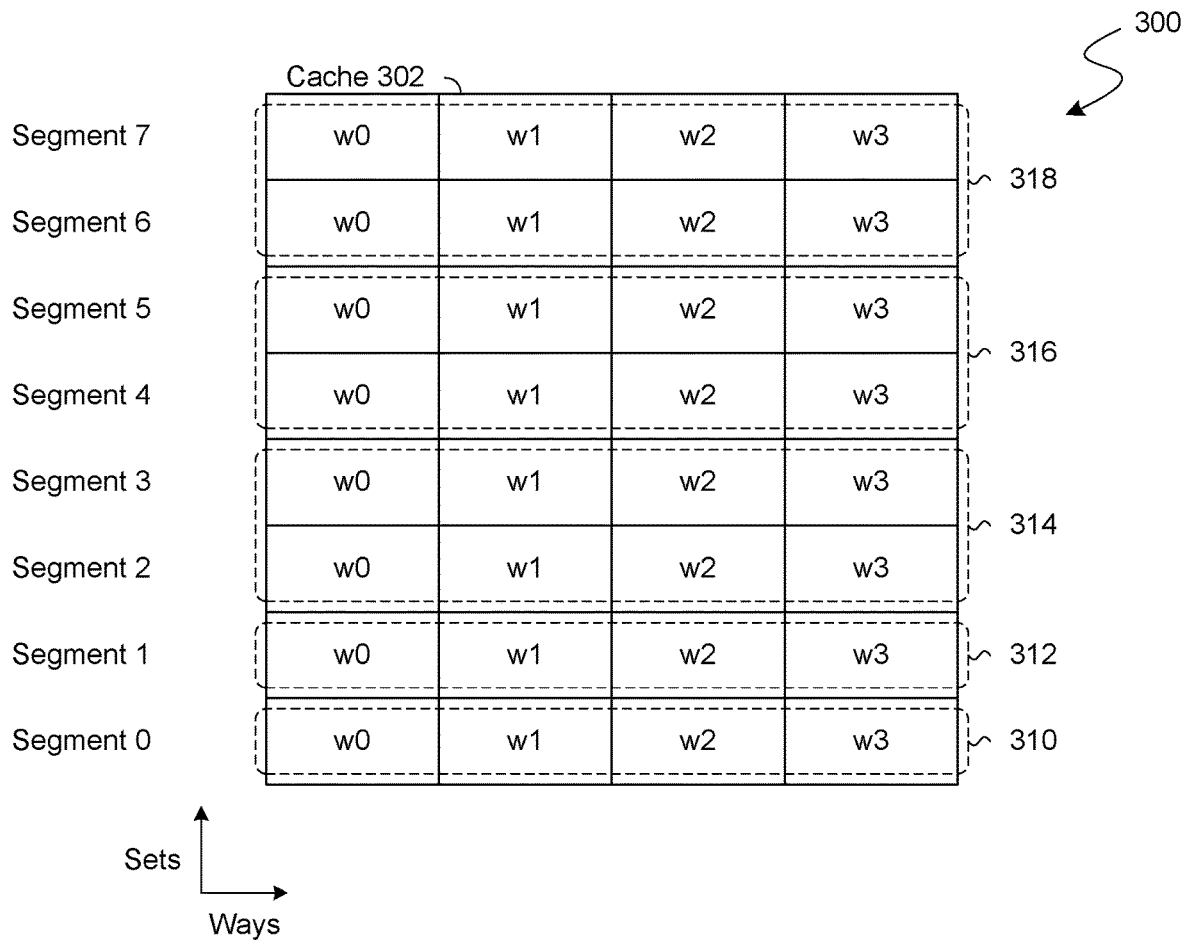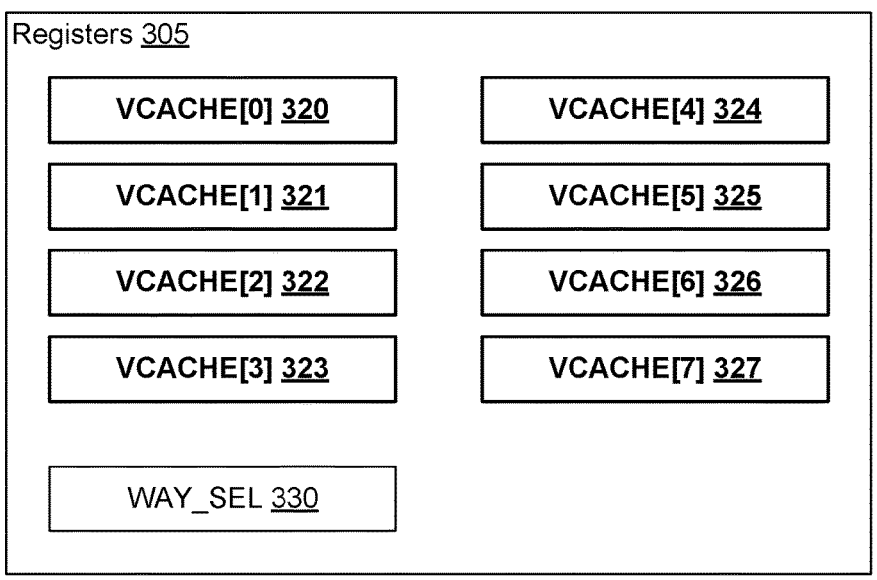
FIG. 3A

VCACHE[x] register 500

| [63:14] | [13:12] | [11:4] | [3:0] |
|---|---|---|---|
| Reserved 504 | SET ADDR SELECT 503 | REMAP SET BASE ADDR 502 | VCACHE_SIZE 501 |

FIG. 5A

VCACHE Control[x] register 510

| [63:3] | [2] | [1] | [0] |
|---|---|---|---|
| Reserved 514 | Write Policy 513 | Bypass 512 | Valid 511 |

FIG. 5B

PER CLOS WAY SELECT register 520

| [63:62] | [61:60] | ... | [5:4] | [3:2] | [1:0] |
|---|---|---|---|---|---|
| WS_CL31 525 | WS_CL30 524 | ... | WS_CL2 523 | WS_CL1 522 | WS_CL0 521 |

FIG. 5C

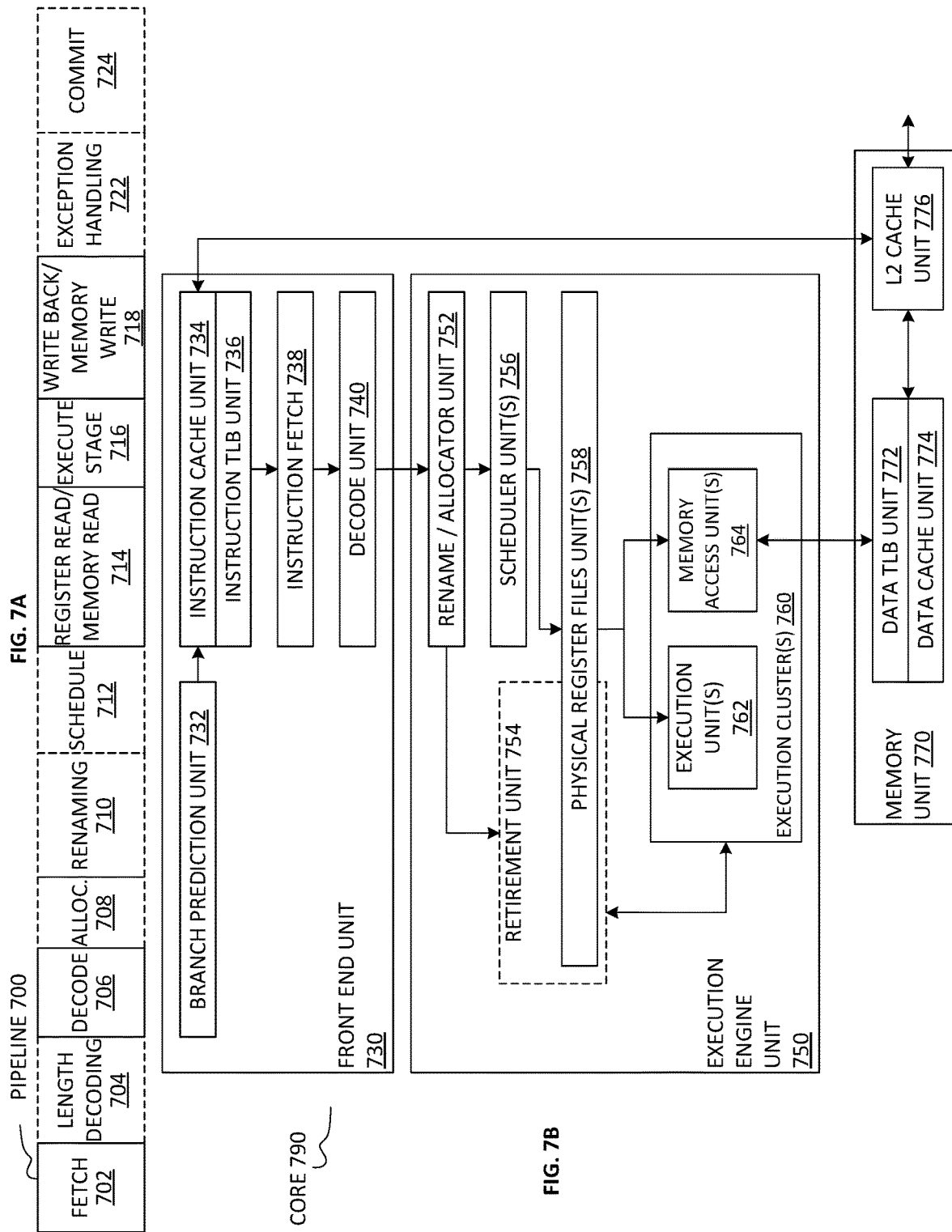

TWO-STAGE CACHE PARTITIONING

BACKGROUND

1. Technical Field

Embodiments of the invention relate generally to cache memory and more particularly, but not exclusively, to configuring a dual basis cache partition scheme.

2. Background Art

In various multi-core processors or other processing systems, cores each have an associated cache memory, i.e., a private cache which is accessible only by that core. Furthermore, a shared cache memory, accessible to multiple cores, is often provided to extend cache capacity. Benefits derived from using a cache memory are a function of the percentage of memory access requests that can be serviced without accessing system memory directly.

Cache access time can be affected by propagation delays present in electrical circuitry. In general, cache access time increases in proportion to such physical properties as the distance between the cache and an accessing logic, the width of a data interconnect, and so forth.

The optimal cache design for a multi-core architecture is a current research issue, and one of the most basic questions is how cache resources should be organized as a single (e.g., banked) shared cache, and/or with respective private caches for the cores. A shared last-level cache can perform poorly when the private data of each thread's working set exceeds a core's private cache and data has to be repeatedly refetched from a remote piece of the shared cache. A private last-level cache can perform poorly when threads share most of their working sets. Thus, an efficient choice depends on the total amount of cache capacity, an application's working set size, and the application's data sharing patterns. Both shared and private access patterns are used in recognition, data mining, and synthesis (RMS) applications, as an example.

BRIEF DESCRIPTION OF THE DRAWINGS

The various embodiments of the present invention are illustrated by way of example, and not by way of limitation, in the figures of the accompanying drawings and in which:

FIGS. 3A, 3B show functional block diagrams each illustrating respective features of dual basis cache partitioning according to an embodiment.

FIGS. 5A through 5C show data diagrams each illustrating respective features of a register to provide cache partitioning information according to a corresponding embodiment.

FIG. 7A is a block diagram illustrating both an exemplary in-order pipeline and an exemplary register renaming, out-of-order issue/execution pipeline according to embodiments.

FIG. 7B is a block diagram illustrating both an exemplary embodiment of an in-order architecture core and an exemplary register renaming, out-of-order issue/execution architecture core to be included in a processor according to embodiments;

DETAILED DESCRIPTION

Figure 1A:
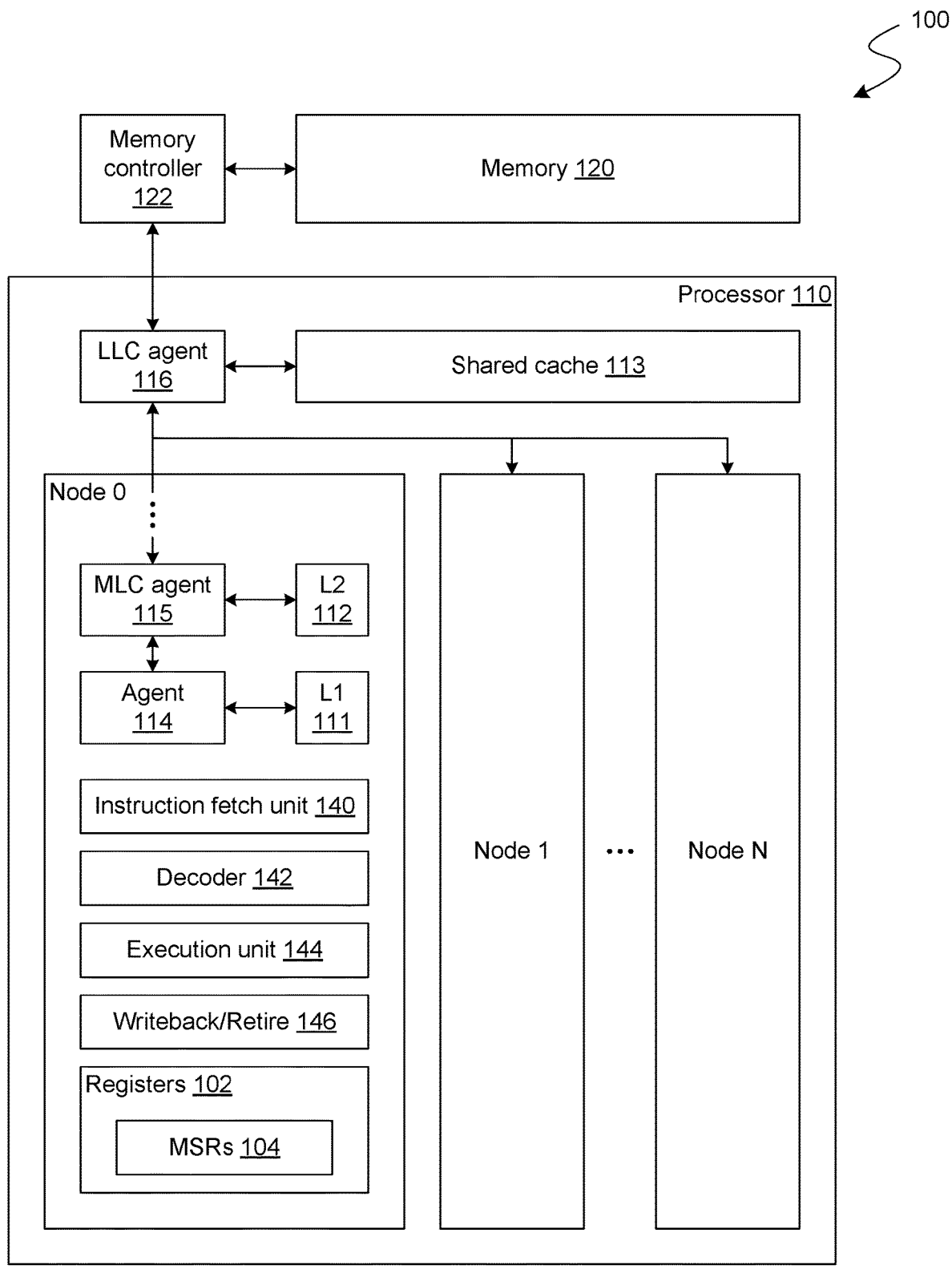
FIGS. 1A, 1B show functional block diagrams each illustrating respective features of a system to provide access to a partitioned cache according to a corresponding embodiment.

Embodiments described herein variously provide techniques and mechanisms to facilitate access to a cache based on a dual basis partition scheme. In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry to provide access to a cache based on a dual basis partition scheme.

Conventional computer systems frequently rely on multiple levels of caching to improve performance. A cache is a high-speed memory positioned between a processor core and a main memory to service memory access requests faster than they could be serviced from system memory. Thus, when the processor needs to read from or write to an object in a system memory, it first checks whether that object is in the cache. If so, a cache "hit" has occurred and the processor immediately reads from or writes to the cache, which is much faster than reading from or writing to main memory. Conversely, if the processor does not find the object in the cache, a cache "miss" has occurred. If so, the cache allocates a new entry, and copies in data from main memory. Then, the request is fulfilled from the contents of the cache. Data is typically transferred between main memory and cache in blocks of fixed size, called cache lines. When a cache line is copied from main memory into the cache, a cache entry is created. The cache entry will include the copied data as well as the requested memory location (often called a tag).

Such caches are typically implemented with a volatile memory such as static random access memory (SRAM). Cache management protocols are used to ensure that the most frequently accessed data and instructions are stored within one of the levels of cache, thereby reducing the number of memory access transactions and improving performance. Often, in order to make room for the new entry on a cache miss, the cache has to evict one of the existing entries. The heuristic that it uses to choose the entry to evict is called the replacement policy which is applied to associative caches on a number of set entries, typically not comprehensively on the entire cache. In a set associative cache, more than one memory location of the cache is mapped to a corresponding memory location of the main memory. One problem with any replacement policy is that it must predict which existing cache entry is least likely to be used in the future. One popular replacement policy, least-recently used (LRU), replaces the least recently accessed entry.

FIG. 1A shows features of a system 100 to provide access to a partitioned cache according to a corresponding embodiment. The system 100 illustrates one example of an embodiment wherein a cache is partitioned according to a dual basis (or "two stage") scheme which includes a first partitioning on a set basis, and a second partitioning on a way basis.

Figure 1B:
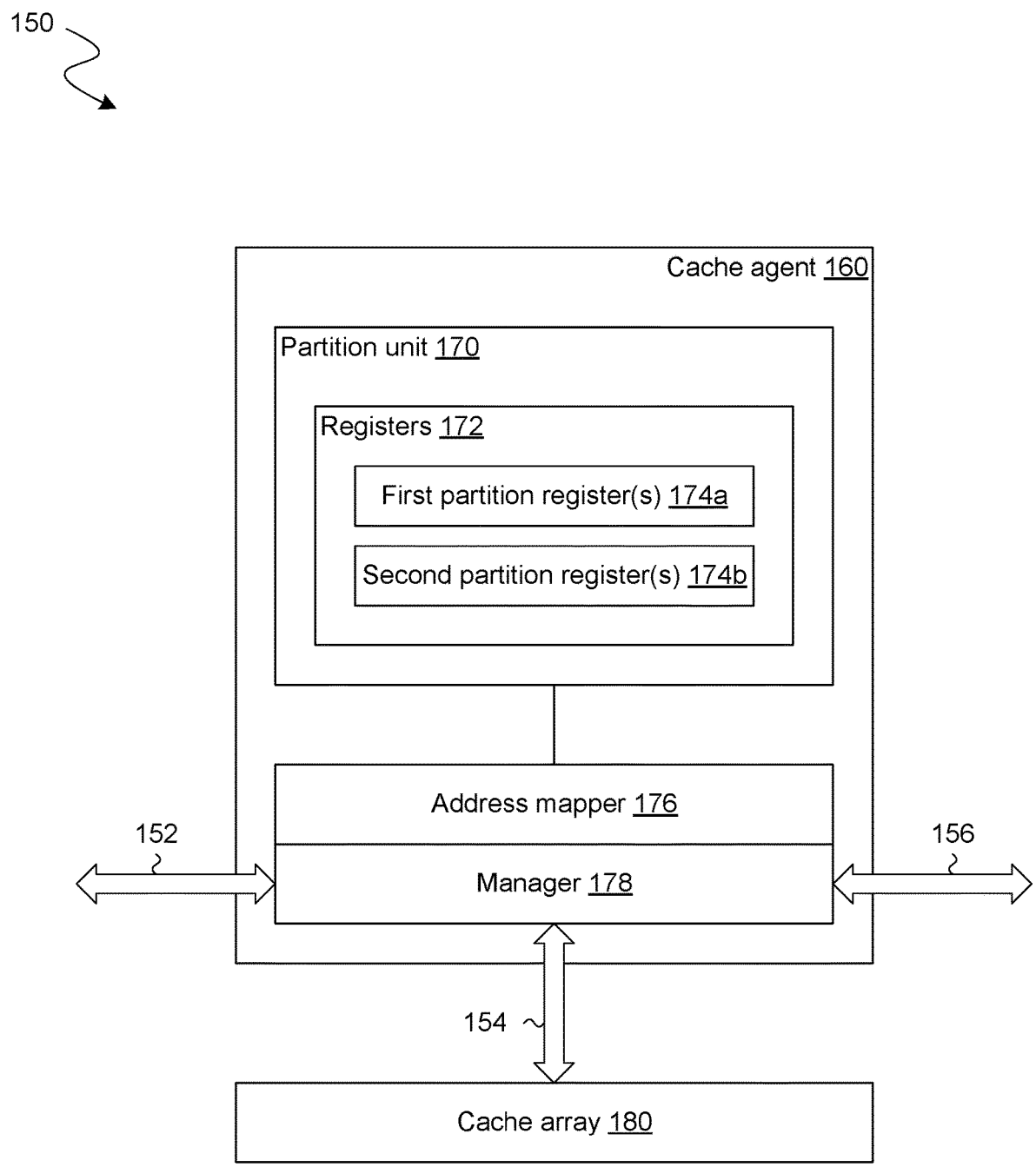

As shown in FIG. 1A, system 100 comprises a processor 110, a memory 120, and a memory controller 122 to provide processor 110 with access to memory 120. Processor 110 comprises one or more processor nodes—e.g., wherein processor 110 is a chip multi-processor (CMP). In some embodiments, each node constitutes, or includes, a processor core (core), logical processor, or hardware thread. The details of one example node (i.e., node 0) are illustrated in FIGS. 1A, 1B. It will be understood, however, that—in various embodiments—some or all such nodes each comprise a respective set of logic, components, circuitry, and/or configuration which is similar to that of node 0.

In the example embodiment shown, node 0 of processor 110 includes a set of registers 102, a level 1 cache (L1) 111, and a L2 (L2) or mid-level cache (MLC) 112. The set of registers 102 further include a set of machine specific register (MSRs) 104. According to an embodiment, the MSRs 104 are accessible and/or programmable by users at boot time, such as through the Basic Input-Output System (BIOS), or at runtime, such as through the operating system (OS) and/or an application running on the OS.

In some embodiments, as shown in FIG. 1, processor 110 further includes a shared cache 113 (e.g., a L3 cache, a L4 cache, or the like) that is communicatively coupled to, and shared by, some or all of the nodes 0, 1, ..., N shown. In other embodiments (not shown), the shared cache 113 is physically distributed and logically shared among the nodes. Each of L1, L2/MLC, and shared caches, according to an embodiment, is managed by a respective cache agent or controller (114-116). These caches are usable for caching data (and/or instructions) according to a specified set of cache management policies.

In some embodiments, a set of cache management policies includes configurations and algorithms relating to cache partitioning, eviction, replacement, prefetch, allocation, etc. One or more cache agents or controllers are used to perform the functions of a home agent, which utilize directories to ensure or enforce cache coherence. The data (and/or instructions) stored within the various processor caches are managed at the granularity of cache lines which are a fixed size (e.g., 64, 128, 512 Bytes in length). Each node of the exemplary embodiments further includes an instruction fetch unit 140 for fetching instructions from main memory 120 via memory controller 122 and/or from the shared LLC 113 via LLC agent 116; a decoder 142 for decoding the instructions (e.g., decoding program instructions into micro-operations or "uops"); an execution unit 144 for executing the decoded instructions; and a writeback unit 146 for retiring the instructions and writing back the results. In some embodiments, the instruction fetch unit 140 also performs prefetching of instructions from main memory.

FIG. 1B shows features of a device 150 to access to a partitioned cache according to a corresponding embodiment. Device 150 illustrates one example of an embodiment which supports a two-part cache partitioning scheme—e.g., wherein device 150 provides functionality of processor 110 and/or other such resources of system 100.

As shown in FIG. 1B, device 150 comprises a cache agent 160 which (for example) is one of agent 114, MLC agent 115, or LLC agent 116. Cache agent 160 includes a partition unit 170 comprising any of various types of integrated circuitry which are suitable to define partitions according to a two-part scheme. In an embodiment, a first part of said scheme comprises a set-wise partitioning of a cache array 180 (e.g., one of L1 cache 111, L2 cache 112, or shared cache 113) which is included in—or alternatively, is to be coupled to—device 150.

In the example embodiment shown, partition unit 170 includes, is coupled to, or otherwise operates based on registers 172 which are to provide cache partition information. In an alternative embodiment, one or more of registers 172 are instead made available from outside cache agent 160—e.g., wherein registers 102 comprises some or all such registers. Registers 172 comprise one or more first partition register(s) 174a which are to facilitate a set-wise partitioning part of a two-part partitioning scheme. For example, cache array 180 is configured as a set associative cache comprising an arrangement of sets which each include respective ways. In an embodiment, a two-part partitioning scheme at least partitions a given group of the sets in cache array 180, set-wise, from one or more other such groups of sets. The resulting set-wise partitions are variously designated as being available for allocation each to a different respective one or more resources (or resource types) of the processor.

In one such embodiment, the first partition register(s) 174a are used to provide information which specifies or otherwise indicates, for each set-wise partition of one or more set-wise partitions, the respective sets of cache array 180 which belong to that set-wise partition. By way of illustration and not limitation, cache agent 160 accommodates configuring of cache array 180 with multiple set-wise partitions which each correspond to a different respective one or more of the first partition register(s) 174a. For a given set-wise partition, the corresponding one or more of first partition register(s) 174a identify the sets in that partition and, in some embodiments, identify one or more sequences of bits which are to facilitate a conversion (or "mapping") between addresses which target respective locations in different set-wise partitions.

In various embodiments, a second part of the scheme comprises way-wise partitioning wherein different resources (or resource types) of processor execution are variously designated as being able to be allocated a respective one or more types of ways of cache array 180 (e.g., including way types which are based on a relative ordering of ways in a given set). By way of illustration and not limitation, registers 172 further comprise one or more second partition register(s) 174b which are to provide information which specifies or otherwise indicates, for each resource of various processor execution resources, the respective one or more types of ways which are available to be allocated to that resource.

In some embodiments, cache partitioning is provided by a combination of a set-wise partition and a way-wise partition—e.g., wherein a given cache partition is defined as a portion of cache array 180 which is both in one particular set-wise partition and in one particular way-wise partition.

In one such embodiment, device 150 provides address translation functionality for use in accessing such a partition—e.g., wherein address translation is transparent (for example) to an application, thread, core and/or other resource of processor execution. A cache partition in such an embodiment is referred to herein as a "virtual cache."

By way of illustration and not limitation, cache agent 160 further comprises circuitry (such as that of the illustrative address mapper 176 and manager 178 shown) which is to selectively determine whether and how a given cache line of cache array 180 is to be accessed based on the partitioning which is indicated by registers 172. For example, cache agent 160 is coupled to participate in communications 152 whereby manager 178 receives, snoops or otherwise detects an address which is communicated in or with a memory access request. Manager 178 provides functionality to determine whether (or not), based on the memory access request, cache agent 160 is to access cache array 180 using communications 154. Alternatively or in addition, manager 178 determines, based on the memory access request, whether cache agent 160 is to participate in communications 156 which, for example, communicate data and/or instructions with a system memory (not shown).

In an illustrative scenario according to one embodiment, manager 178 detects an address which targets a location of a given virtual cache. Manager 178 processes the address using the address mapper 176, which converts the address into a corresponding "mapped" address which instead targets a corresponding location in a different virtual cache. In an embodiment, such address mapping is based on the information provided by first partition register(s) 174a and/or by second partition register(s) 174b.

Figure 2:
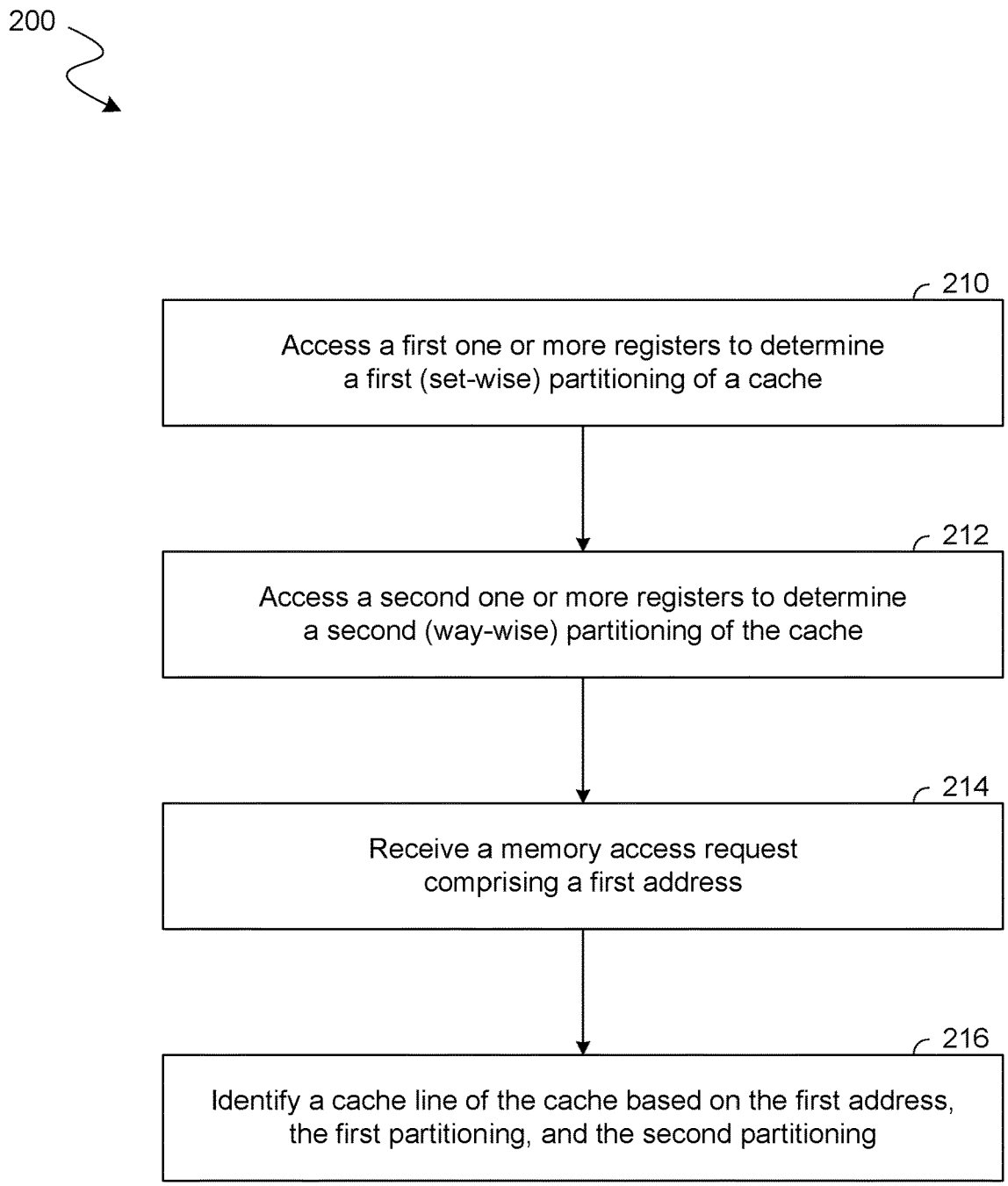
FIG. 2 shows a flow diagram illustrating features of a method to facilitate caching functionality according to an embodiment.

FIG. 2 shows features of a method 200 to facilitate caching functionality according to an embodiment. Method 200 illustrates one example of an embodiment wherein cache partition information is provided, read or otherwise accessed to provide both set-wise partitioning of a cache, and way-wise partitioning of the cache. Operations such as those of method 200 are performed, for example, with some or all of system 100.

As shown in FIG. 2, method 200 comprises (at 210) accessing a first one or more registers to determine a first, set-wise, partitioning of a cache (such as one of L1 cache 111, L2 cache 112, or shared cache 113). For example, the accessing at 210 is to write, read or otherwise determine information such as that provided by the first partition register(s) 174a.

In various embodiments, the first one or more registers comprise a first plurality of registers (e.g., some or all of the VCACHE[x] registers variously described herein) which are each to correspond to a different respective one of multiple set-wise partitions. For example, in one such embodiment, the cache comprises multiple equally sized segments (which, for example, each comprise a same total number of sets). For each of the first plurality of registers, the register is to provide a respective first set of bits which is to identify one or more of the multiple segments as each belonging to the corresponding set-wise partition.

In some embodiments, for each of the first plurality of registers, the register is additionally or alternatively to provide a respective second set of bits (e.g., the REMAP SET BASE ADDR value described herein) which is to indicate a base of the corresponding set-wise partition. Additionally or alternatively, for each of the first plurality of registers, the register is to provide a respective third set of bits (e.g., the SET ADDR SELECT value described herein) to facilitate a selection of the corresponding set-wise partition over one or more other set-wise partitions.

In various embodiments, the first one or more registers further comprise a second plurality of registers (e.g., including some or all VCACHE Control[x] registers described herein) which are each to correspond to a different respective one of the multiple set-wise partitions. For each register of the second plurality of registers, the register is to identify one or more conditions to the authorization of a given access to the corresponding set-wise partition.

In some embodiments, for each set-wise partition of the cache, the first one or more registers are to identify a respective plurality of addresses as corresponding each to the set-wise partition. For example, the first one or more registers comprise a respective two registers (such as the VCACHE_Address_Base[x] register and a VCACHE_Address_Range[x] register described herein) for a given set-wise partition, wherein the respective two registers are to identify a base and size of an associated address range.

Referring again to FIG. 2, method 200 further comprises (at 212) accessing a second one or more registers to determine a second (way-wise) partitioning of the cache. For example, the accessing at 212 is to write, read or otherwise determine information such as that provided by the second partition register(s) 174b. In one example embodiment, the second one or more registers comprise a first register (such as the WAY_SEL register described herein) comprising multiple fields which are each to correspond to a different respective processor execution resource. For each of the multiple fields, the field is to provide a respective value indicating one or more types of ways as being available to be allocated to the corresponding processor execution resource. By way of illustration and not limitation the multiple fields comprise a first field which corresponds to a first processor execution resource which (for example) includes one of a core, a thread, or a class of service. In an embodiment, memory access requests which are provided by or otherwise associated with the first processor execution resource are able to be allocated one or more ways, as indicated by information in the first field.

Method 200 further comprises (at 214) receiving a memory access request comprising a first address. Based on the memory access request, method 200 (at 216) identifies a cache line of the cache—e.g., wherein such identifying is based on the first address, the first partitioning, and the second partitioning. In various embodiments, the identifying at 216 comprises determining that the first address corresponds to a first set of a first set-wise partition. For example, the memory access request is identified as corresponding to a particular processor execution resource, which—in turn—is identified as corresponding to the first set-wise partition. In one such embodiment, an offset between the first set and a first base of the first set-wise partition is identified, and an association of the memory access request with a second set-wise partition is detected. Based on each of the association, the offset, and a second base of the second set-wise partition, such embodiments variously identify a second set of the second set-wise partition.

Figure 3B:
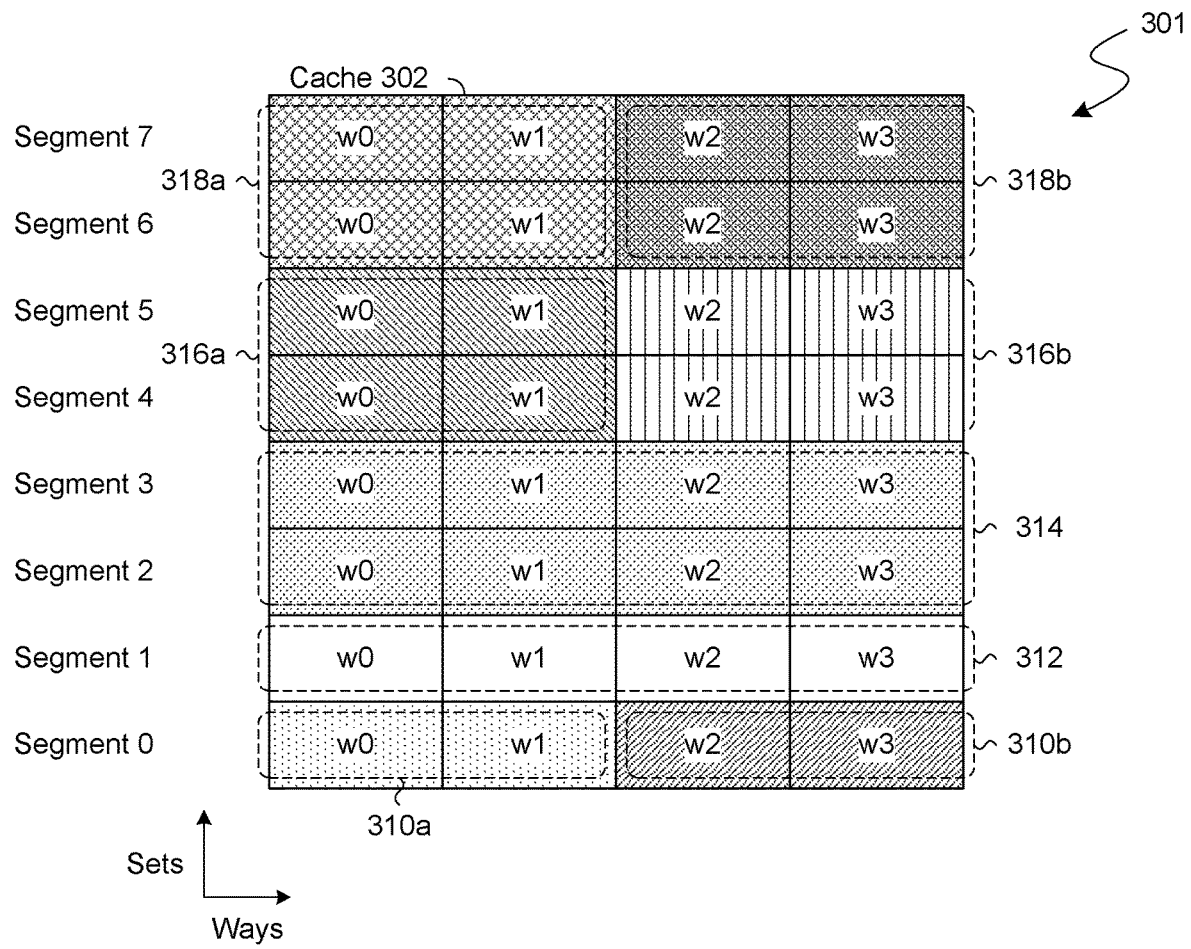

FIGS. 3A, 3B shows set-based partitioning 300 and way-based partitioning 301 (respectively) each of a two-part cache partitioning scheme according to an embodiment. Partitioning 300 and partitioning 301 illustrate one example embodiment wherein set-wise partitions each include a different respective one or more sets of a cache, and wherein way-wise partitions comprise different respective ways of each of the sets. In one embodiment, set-based partitioning 300 and way-based partitioning 301 are to partition a cache of processor 110, such as one of L1 cache 111, L2 cache 112, shared cache 113.

In FIG. 3A, the example cache 302 shown comprises sets which—to facilitate the two-part partitioning—are logically grouped into multiple segments (such as the illustrative segments 0 through 7 shown). For each of the eight segments 0 through 7 shown, the sets of the segment each comprise a respective plurality of ways.

By way of illustration and not limitation, segment 0 comprises multiple sets which each include a respective first way, a respective second way, a respective third way, and a respective fourth way. The respective first, second, third, and fourth ways of these multiple sets are arranged in a same order relative to each other. For example, respective first ways of the multiple sets in segment 0 are represented by the label w0, wherein the second ways of the multiple sets are represented by the label w1, the third ways by the label w2, and the fourth ways by the label w3. Such labeling is similarly used in FIGS. 3A, 3B for the ways in the respective sets of the other segments 1 through 7.

Set-based partitioning 300 is provided based on registers 305 which (for example) provide functionality such as that of first partition register(s) 174a—e.g., wherein one or more operations of method 200 determine and/or are based on information in registers 305. In the example embodiment shown, registers 305 comprise eight VCACHE[x] registers 320 through 327 which are each to facilitate the configuring of up to eight different respective set-wise partitions. For example, each of VCACHE[x] registers 320 through 327 is available to store information which, for a corresponding set-wise partition, is to specify or otherwise indicate a base of that partition and a size of the partition. In some embodiments, such information further provides information to facilitate the translation of an address in a memory access request. Other embodiments variously provide a larger—or alternatively, smaller—total number of VCACHE[x] registers, to enable the provisioning of more (or alternatively, fewer) set-wise partitions of cache 302.

In an illustrative scenario according to one embodiment, partitioning 300 is provided based on only a subset of VCACHE[x] registers 320 through 327. For example, VCACHE[0] register 320 and VCACHE[1] register 321 variously receive information to facilitate the configuration of two set-wise partitions 310, 312 (respectively). Similarly, VCACHE[2] register 322 and VCACHE[3] register 323 variously receive other information to facilitate the configuration of two set-wise partitions 314, 316 (respectively)—e.g., wherein VCACHE[4] register 324 receives information to facilitate the configuration of another set-wise partition 318. In the example embodiment shown, partition 310 comprises all of the sets of segment 0—i.e., including all of the respective ways of each such set. Furthermore, partition 312 similarly comprises all of the sets of segment 1, wherein partition 314 comprises all of the sets of segments 2 and 3. Further still, partition 316 comprises all of the sets of segments 4 and 5, wherein partition 318 comprises all of the sets of segment 6 and 7.

In one such embodiment, registers 305 further comprise one or more registers (such as the illustrative WAY_SEL register 330 shown) to facilitate way-based partitioning 301 which takes place in addition to set-based partitioning 300. The WAY_SEL register 330 illustrates any of various suitable repositories for information which identifies, for a given resource or class of resources—e.g., including a hardware resource (class) or a software resource (class)—whether or not that resource (class) is available for allocation to a particular one or more types of ways, or "way types." The one or more way types, in some embodiments, are from a format according to which ways are ordered in a given set of cache 302.

For example, WAY_SEL register 330 provides information which specifies or otherwise indicates whether or not the respective first ways (indicated by "w0") of some or all sets of cache 302 are available to be allocated to some first resource (or resource type). Furthermore, such information similarly indicates whether or not the respective second ways (indicated by "w1") of some or all sets of cache 302 are available to be allocated to that same first resource class). Further still, such information similarly indicates whether or not the respective third ways (indicated by "w2") and/or the respective fourth ways (indicated by "w3") of some or all sets of cache 302 are available to be allocated to the first resource (class).

In the example embodiment shown, the partition 310 (which is defined with VCACHE[0] register 320 in set-based partitioning 300), is made available to be allocated—and, for example, is allocated—to two resource types, such as two different threads, two different cores, two different classes of service (CLOSs), or the like. Furthermore, the way-based partitioning 301 is based on information—provided with WAY_SEL register 330—which indicates that one of these two resources is able to be allocated only first ways (w0) and second ways (w1) of cache 302, and that the other one of these two resources is able to be allocated only third ways (w2) and fourth ways (w3) of cache 302. Accordingly, the combination of VCACHE[0] register 320 and WAY_SEL register 330 serves to provide a two-part partitioning, wherein the set-wise partition 310 is further partitioned way-wise into two partitions 310a, 310b which are more granular.

In a similar way, way-based partitioning 301 comprises set-wise partition 316 being further partitioned, way-wise, into partitions 316a, 316b, and set-wise partition 318 being further partitioned, way-wise, into partitions 318a, 318b. However, WAY_SEL register 330 accommodates a partitioning selectivity wherein one or more other set-wise partitions—e.g., including partitions 312, 314— avoid such way-wise partitioning, or (in other embodiments) are subjected to different way-wise partitioning. Accordingly, various embodiments provide more granular partitioning of a cache which, for example, has a relatively few number of ways (e.g., not more than eight and, in some embodiments, not more than four) per set.

Figure 4A:
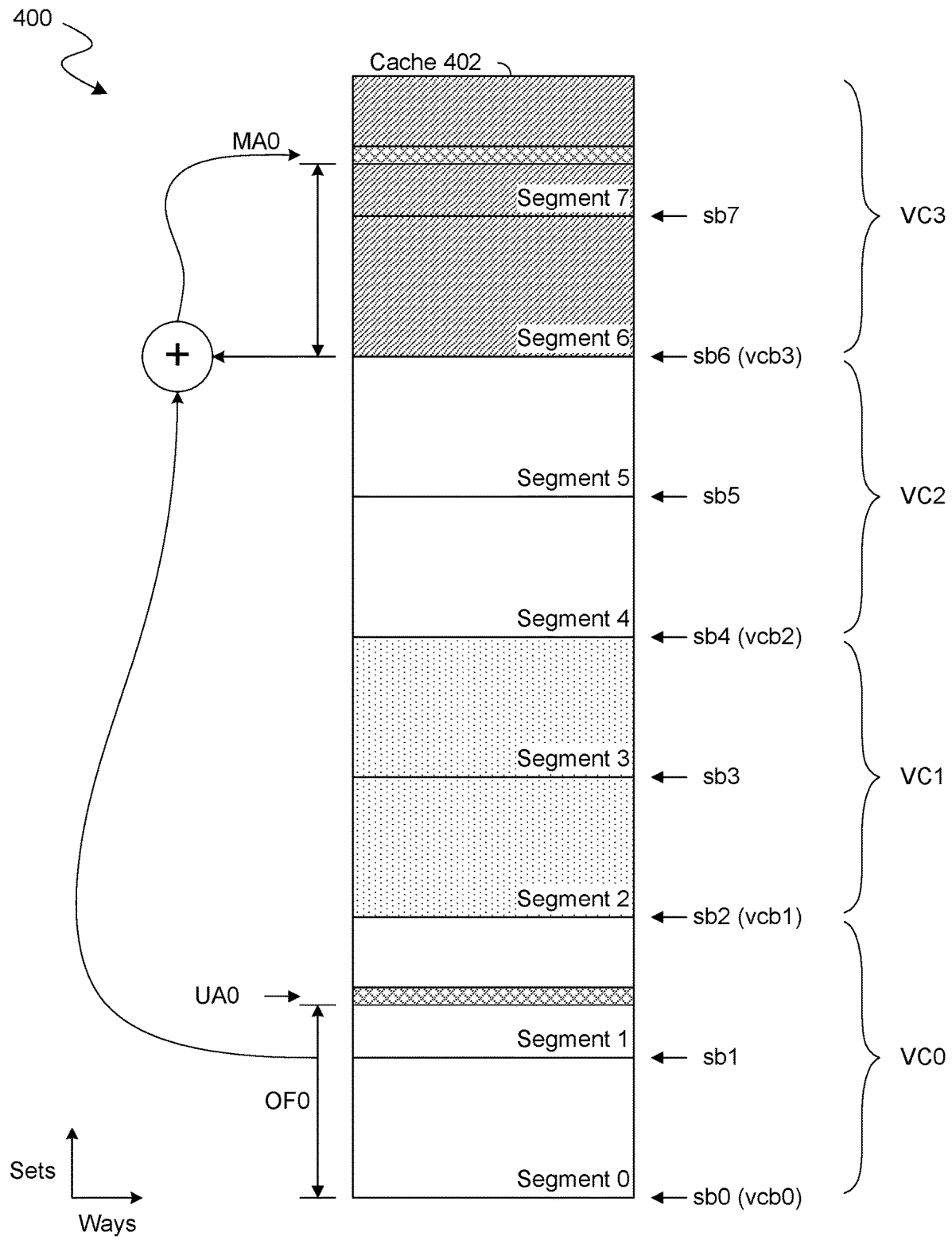
FIGS. 4A, 4B show functional block diagrams each illustrating respective features of processing to identify a line of a partitioned cache according to a corresponding embodiment.
Figure 4B:
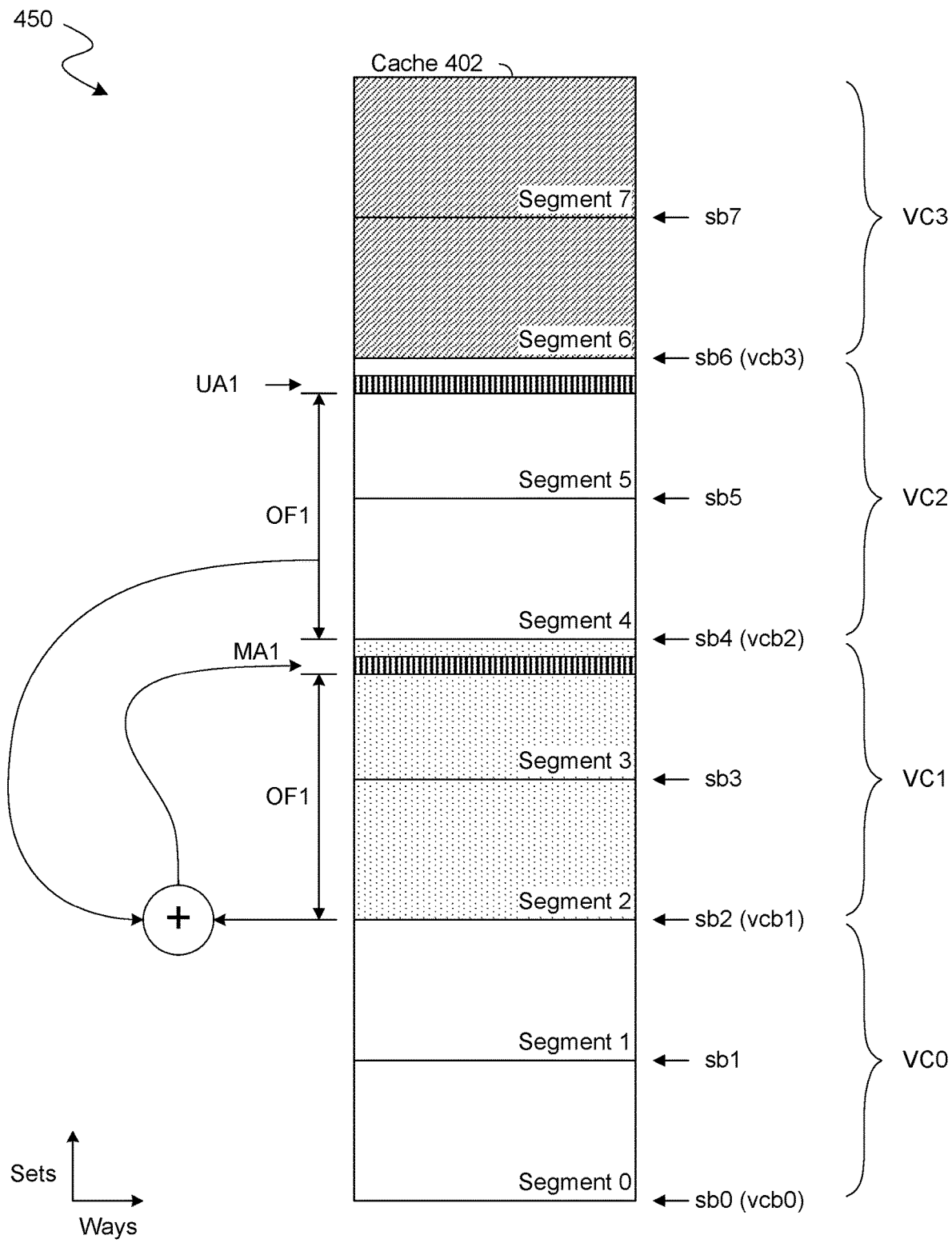

FIGS. 4A, 4B show features of address processing 400 and address processing 450 (respectively) which are each to identify a respective line of a partitioned cache according to a corresponding embodiment. Address processing 400 and address processing 450 each illustrate an example of a respective embodiment wherein information, which describes a partition created by a two-part partitioning scheme, is accessed to map or otherwise translate one address (from a memory access request, for example) into a corresponding second address. In various embodiments, address processing 400 and/or address processing 450 is performed with one of L1 cache 111, MLC agent 116, LLC agent 116, or manager 178—e.g., wherein address processing 400 and/or address processing 450 includes or is otherwise based on one or more operations of method 200.

As shown in FIGS. 4A, 4B, address processing 400 and address processing 450 are variously performed to access a cache 402 comprising sets which are logically arranged into some number (in this example, eight) of segments. The segments provide a basis for set-wise partitioning of cache 402—e.g., wherein the respective bases sb0 through sb7 of the segments 0 through 7 are each a candidate to be a base of a set-wise partition.

In the example embodiment shown, a base sb0 of segment 0 is configured to be the base vcb0 of a virtual cache VC0 which comprises segment 0 and segment 1. Furthermore, a base sb2 of segment 2 is configured to be the base vcb1 of a virtual cache VC1 which comprises segment 2 and segment 3—e.g., wherein a base sb4 of segment 4 is configured to be the base vcb2 of a virtual cache VC2 which comprises segment 4 and segment 5. Further still, a base sb6 of segment 6 is configured to be the base vcb3 of a virtual cache VC3 which comprises segment 6 and segment 7.

In various embodiments, a first memory access request is received, snooped or otherwise detected, wherein the first memory access request includes an address UA0 which is to be subjected to address processing 400. For example, address UA0 corresponds to a location in a one of virtual caches VC0 through VC3, wherein address processing 400 translates, maps or otherwise converts address UA0 into another address which instead corresponds to a location in a different one of virtual caches VC0 through VC3.

In an illustrative scenario according to the embodiment shown, the unmapped address UA0 corresponds to a first location in virtual cache VC0—e.g., wherein the first location is at an offset OF0 from the base vcb0 of virtual cache VC0. The first memory access request is identified by a cache agent, or other suitable resource, as being associated with (e.g., being generated or otherwise provided by) a first resource (or resource type) to which virtual cache VC3 is currently allocated. For example, the first resource is a particular core, or a particular thread for which access to virtual cache VC3 is authorized. Alternatively or in addition, the memory access request is associated with an application which has been given a particular class of service (CLOS) which is supported at least in part by virtual cache VC3.

Based on the identified association with virtual cache VC3, address processing 400 maps unmapped address UA0 to another "mapped" address MA0 which corresponds to a location in virtual cache VC3. For example, address processing 400 identifies base vcb0 and offset OF0 based on bits of unmapped address UA0 and information (such as that provided by registers 305) which identifies the respective bases of virtual caches VC0 through VC3. Address processing 400 then applies the same offset OF0 to the base vcb3 of virtual cache VC3, to identify a set (in this example, in segment 7) which corresponds to the address MA0.

Referring now to FIG. 4B, in various embodiments, a second memory access request is detected, wherein the second memory access request includes an address UA1 which is to be subjected to address processing 450. In the example embodiment shown, the unmapped address UA1 corresponds to a second location in virtual cache VC2—e.g., wherein the second location is at an offset OF1 from the base vcb2 of virtual cache VC2. The second memory access request is identified—by a cache agent, for example—as being associated with a second resource (or resource type) to which virtual cache VC1 is currently allocated.

Based on the identified association of the second memory access request with virtual cache VC1, address processing 450 maps the address UA1 to another "mapped" address MA1 which corresponds to a location in virtual cache VC1. For example, address processing 450 identifies base vcb2 and offset OF1 based on bits of unmapped address UA1 and information (such as that provided by registers 305) which identifies the respective bases of virtual caches VC0 through VC3. Address processing 450 then applies the same offset OF1 to the base vcb1 of virtual cache VC1, to identify a set (in this example, in segment 7) which corresponds to the address MA1.

FIGS. 5A through 5C show features of registers 500, 510, 520 (respectively) which are to variously provide cache partitioning information according to a corresponding embodiment. In various embodiments, the dual basis partitioning of a cache (and/or the accessing of any one cache partition) is based on information in MSRs 104, first partition register(s) 174a, second partition register(s) 174b, or any of various other suitable repositories of cache configuration information.

For example, in one illustrative embodiment, wherein dual basis partitioning includes up to eight set-wise partitions, eight "Address Base" registers each correspond to a different respective one of the eight partitions. These eight registers—e.g., VCACHE_Address_Base[0] through VCACHE_Address_Base[7]— each identify a respective address as being associated with the respective base of a corresponding set-wise partition. In one such embodiment, the registers further comprise eight "Address Range" registers which also correspond each to a different respective one of the eight set-wise partitions. These eight registers—e.g., VCACHE_Address_Range[0] through VCACHE_Address_Range [7]— each identify a respective range of addresses (starting with a base address) as being variously associated with the respective sets of a corresponding set-wise partitions.

In various embodiments, a given VCACHE_Address_Base[x] register, and a corresponding VCACHE_Address_Range [x] register (where x is a non-negative integer), each further correspond to a VCACHE[x] register—e.g., one of eight such registers VCACHE[0] through VCACHE [7]— which describes a corresponding set-wise partition. In one such embodiment, an address (such as that of a memory access request) is identified as being in a range indicated by the registers VCACHE_Address_Base[x] and VCACHE_Address_Range[x]. Based on such identifying, the address is determined to be associated with some virtual cache which in the set-wise partition indicated by the corresponding VCACHE[x] register.

For example, referring now to FIG. 5A, a VCACHE[x] register 500 comprises a field 501 which specifies or otherwise indicates a size of the corresponding set-wise partition. In the example embodiment shown, field 501 comprises a four-bit value which identifies one or more segments of the cache as belonging to the partition—e.g., wherein such identifying is according to the encoding scheme shown in the table below.

TABLE 1

Encoding Scheme for VACHE_SIZE

| Size value | Segment(s) of Set-Wise Partition |
|---|---|
| 4'b0000 | No Segments |
| 4'b0001 | Full Cache - All Segments |
| 4'b0010 | Upper Half of the Cache - Segments[7:4] |
| 4'b0011 | Lower Half of the Cache - Segments[3:0] |
| 4'b0100 | 1st quarter of the Cache - Segments[1:0] |
| 4'b0101 | 2nd quarter of the Cache - Segments[3:2] |
| 4'b0110 | 3rd quarter of the Cache - Segments[5:4] |
| 4'b0111 | 4th quarter of the Cache - Segments[7:6] |
| 4'b1000 | Only Segment [0] of the Cache |
| 4'b1001 | Only Segment [1] of the Cache |
| ... | ... |
| 4'b1111 | Only Segment [7] of the Cache |

Additionally or alternatively, VCACHE[x] register 500 comprises a REMAP SET BASE ADDR field 502 which identifies a sequence of bits to be used to indicate the base of the set-wise partition. Additionally or alternatively, VCACHE[x] register 500 comprises a SET ADDR SELECT field 503 which identifies another sequence of bits to be used to facilitate selection of the set-wise partition from among all set-wise partitions of the cache. In the embodiment shown, VCACHE[x] register 500 further comprises a field 504 which his reserved for future use.

Referring now to FIG. 5B, a VCACHE Control[x] register 510 provides additional configuration information to determine one or more conditions according to which data is to be cached to a virtual cache in the set-wise partition identified by the corresponding VCACHE[x] register 500. For example, VCACHE Control[x] register 510 comprises a Valid field 511 which to identify (for example) whether the information in the corresponding VCACHE_Address_Range[x] register is currently valid. Additionally or alternatively, VCACHE Control[x] register 510 comprises a Bypass field 512 to identify whether a hit in the corresponding address range is to bypass caching into the cache. Additionally or alternatively, VCACHE Control[x] register 510 comprises a Write Policy field 513 to identify (for example) whether caching for data which is of a particular state—e.g., Dirty—is to be prevented. In the embodiment shown, VCACHE Control[x] register 510 further comprises a field 514 which his reserved for future use.

Referring now to FIG. 5C, a PER CLOS WAY SELECT register 520 provides additional configuration information to determine an allocation of way types to respective resource types (in this example, resources assigned a particular class of service). Such additional configuration information facilitates way-wise partitioning—e.g., in addition to set-wise partitioning which is provided with registers 500, 510 (for example).

In the example embodiment shown, PER CLOS WAY SELECT register 520 comprises a WS_CL0 field 521 to provide a value which identifies, for a first CLOS, which way types are to be available for use in caching on behalf of memory access requests which are associated with that first CLOS. In one such embodiment, this identifying is according to the encoding scheme shown in the table below.

TABLE 2

Encoding Scheme for PER CLOS WAY SELECT fields

| Per CLOS Way Select value | Way types to be available for the CLOS |
|---|---|
| 2'b00 | No Ways |
| 2'b01 | Cache Ways 0 and 1 |
| 2'b10 | Cache Ways 2 and 3 |
| 2'b11 | Cache Ways 0, 1, 2, and 3 |

Additionally or alternatively, PER CLOS WAY SELECT register 520 comprises a WS_CL1 field 522 to provide another value which identifies, for a second CLOS, which way types are to be available for use in caching on behalf of memory access requests which are associated with that second CLOS. Similarly, a WS_CL2 field 523 of PER CLOS WAY SELECT register 520 is to identify which way types are to be available for use in caching on behalf of memory access requests which are associated with a third CLOS. Furthermore, a WS_CL30 field 524 is to identify which way types are to be available for use in caching on behalf of memory access requests which are associated with a thirty-first CLOS—e.g., wherein a WS_CL31 field 525 is to identify which way types are to be available for use in caching on behalf of memory access requests which are associated with a thirty-second CLOS.

Figure 6:
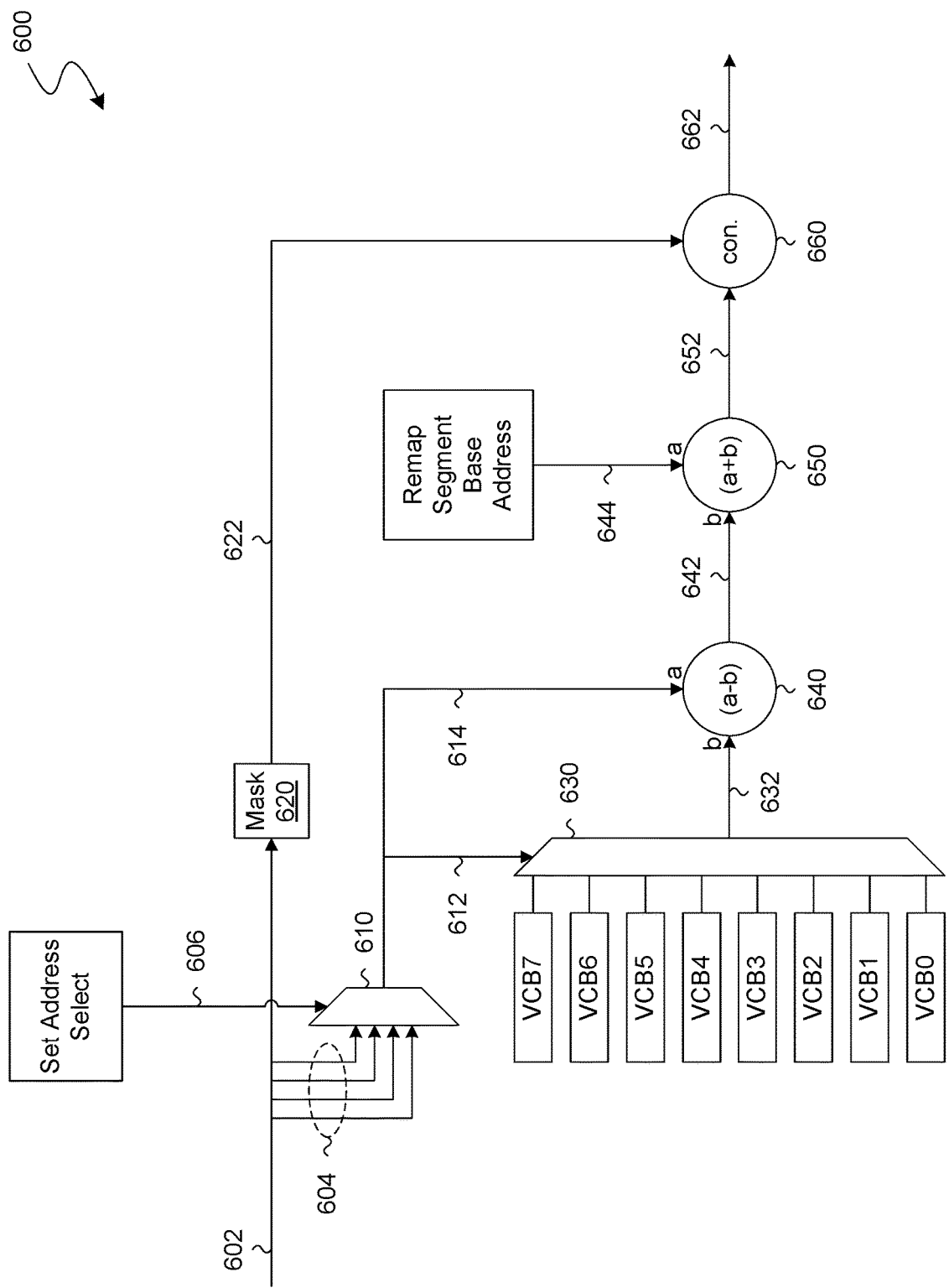
FIG. 6 shows a functional block diagram illustrating features of an address mapper to access a partitioned cache according to an embodiment.

FIG. 6 shows features of an address mapper 600 to access a partitioned cache according to an embodiment. Address mapper 600 illustrates one example of an embodiment which identifies a cache line of one virtual cache based on an address which corresponds to a cache line of a different virtual cache. In various embodiments, address mapper 600 provides functionality such as that of one of the agents 114, 115, 116, or of address mapper 176—e.g., wherein one or more operations of method 200 are performed with address mapper 600.

As shown in FIG. 6, address mapper 600 is coupled to receive, snoop or otherwise detect a memory access request, and to identify an address 602 which is included in (or otherwise communicated in association with) said memory access request. The address 602 corresponds to a cache line of a cache which is partitioned, according to a two-part partition scheme, into multiple virtual caches.

A mask 620 of address mapper 600 receives address 602 and masks one or more most significant bits (MSBs) of address 602, thereby outputting the remaining least significant bits 622 of address 602. Furthermore, various sets of respective bits 604 of address 602 are provided to a selector circuit 610 of address mapper 600—e.g., the selector circuit 610 comprising one or more multiplexers. In an embodiment, each of the sets of respective bits 604 comprises a different respective total number of most significant bits (MSBs) of address 602. By way of illustration and not limitation, a first one of the sets of respective bits 604 comprises the eight MSBs of address 602, wherein a second one of the sets of respective bits 604 comprises the seven MSBs of address 602, and the like.

Selector circuit 610 is coupled to receive a signal 606 which includes or is otherwise based on set address select information such as that which is provided in field 503 of register 500. Based on signal 606, selector circuit 610 selects a particular one of sets of respective bits 604, where said selected set is provided as bits 614. In some embodiments, bits 614 comprises the same bits which are masked by mask 620.

One or more most significant ones of bits 614 (represented as bits 612)—e.g., but only a subset of bits 614—are provided to a selector circuit 630 of address mapper 600. In various embodiments, the total number of bits 612 is sufficient to provide a binary representation of the total number of virtual caches, wherein the total number of bits 614 is sufficient to provide a binary representation of the total number of sets in any one segment of the cache.

Based on bits 612, selector circuit 630 outputs an indication of the base of the corresponding virtual cache indicated by address 602. In one such embodiment, for each of the virtual caches, selector circuit 610 is coupled to receive respective multiple bits which correspond to a base of said virtual cache. For example, selector circuit 610 is coupled to receive—and select between—first bits which corresponds to a base VCB0 of a first virtual cache VC0, second bits which corresponds to a base VCB1 of a second virtual cache VC1, thirds bits which corresponds to a base VCB2 of a third virtual cache VC2, etc.

In an embodiment, bits 612 include enough bits to enable selection of one base (e.g., selection of bits which represent said base) from among the respective bases of each of the virtual caches. By way of illustration and not limitation, selector circuit 610 is able to receive respective bits for up to eight corresponding virtual caches, wherein bits 612 comprise at least three bits to represent any of eight possible selections. Based on bits 612, selector circuit 610 provides, as bits 632, the selected multiple bits which correspond to the base of the virtual cache indicated by address 602

The bits 632 are provided by selector circuit 630 to a subtraction circuit 640, which also receives bits 614. Subtraction circuit 640 then performs a subtraction operation which generates bits 642 that represent a difference between bits 614 and bits 632. More particularly, bits 642 represent an offset between a first set which is indicated by address 602 and a second set which is a base of the virtual cache that includes some or all of the first set.

The bits 642 are provided by subtraction circuit 640 to an addition circuit 650, which also receives bits 644 representing a remap segment base address value (such as that which is provided, for example, in field 502 of register 500). The bits 644 represent base of another virtual cache of the cache, wherein this other virtual cache has been identified as being associated with the memory access request. Addition circuit 650 performs an addition operation which generates bits 652 that represent a sum of bits 642 and bits 644. More particularly, bits 652 represent an application of the offset (which is indicated by bits 642) to the virtual cache base indicated by bits 644.

The bits 652 are subsequently provided by addition circuit 650 to a concatenation circuit 660, which also receives the bits 622 of address 602 which were output by mask 620. Concatenation circuit 660 concatenates bits 652 and bits 622 to generate a mapped address 662—corresponding to address 602—which identifies a set in the other virtual cache. In various embodiments, other operations are performed to determine a particular way of the identified set—e.g., wherein such other operations are based on information such as that provided in WAY_SEL register 330, or in register 520 (for example).

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8A:
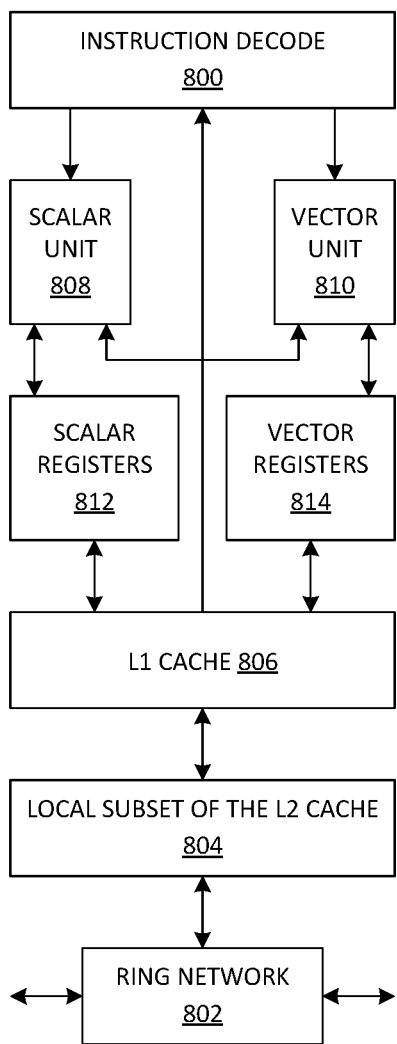
FIGS. 8A through 8B illustrate a block diagram of a more specific exemplary in-order core architecture, which core would be one of several logic blocks (including other cores of the same type and/or different types) in a chip.
Figure 8B:
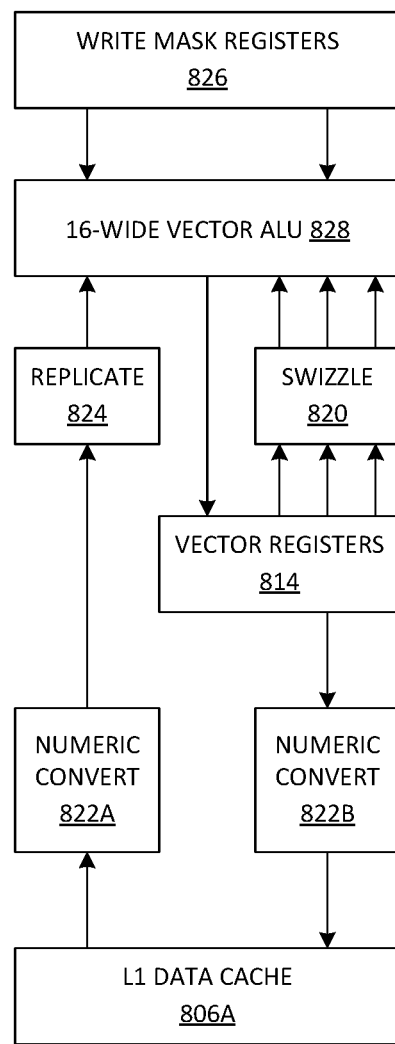

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
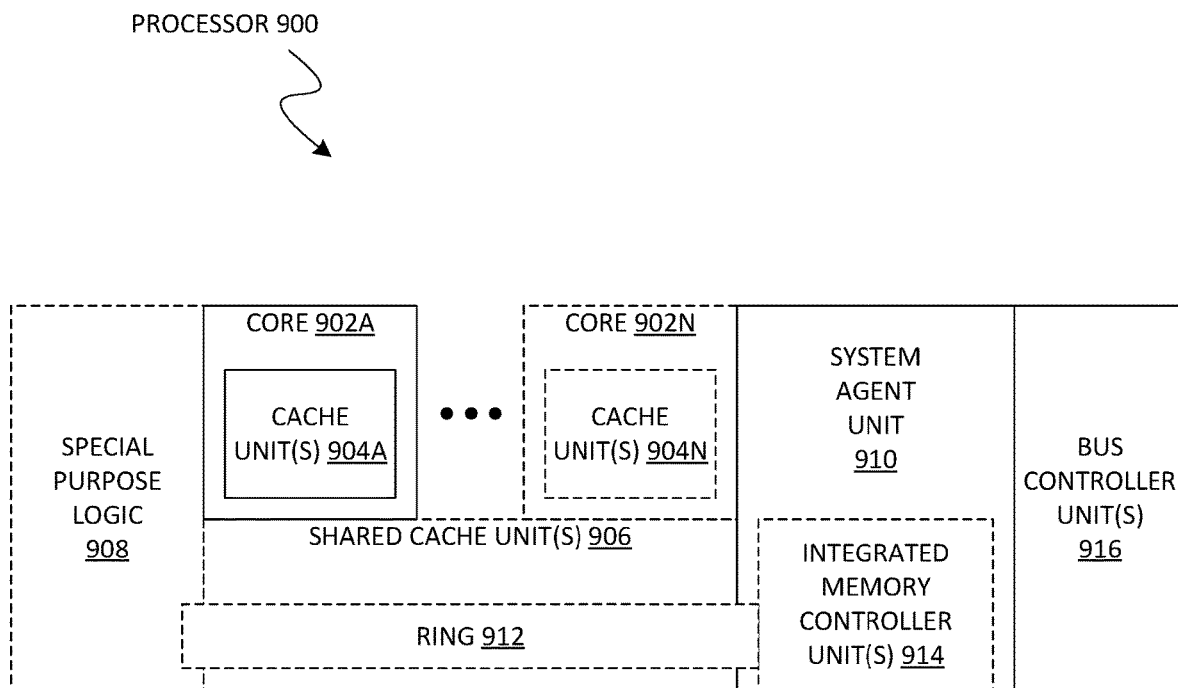
FIG. 9 is a block diagram of a processor that may have more than one core, may have an integrated memory controller, and may have integrated graphics according to embodiments.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes respective one or more levels of caches 904A-N within cores 902A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multithreading. The system agent 910 includes those components coordinating and operating cores 902A-N. The system agent unit 910 may include for example a power control unit (PCU) and a display unit. The PCU may be or include logic and components needed for regulating the power state of the cores 902A-N and the special purpose logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10 through 13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
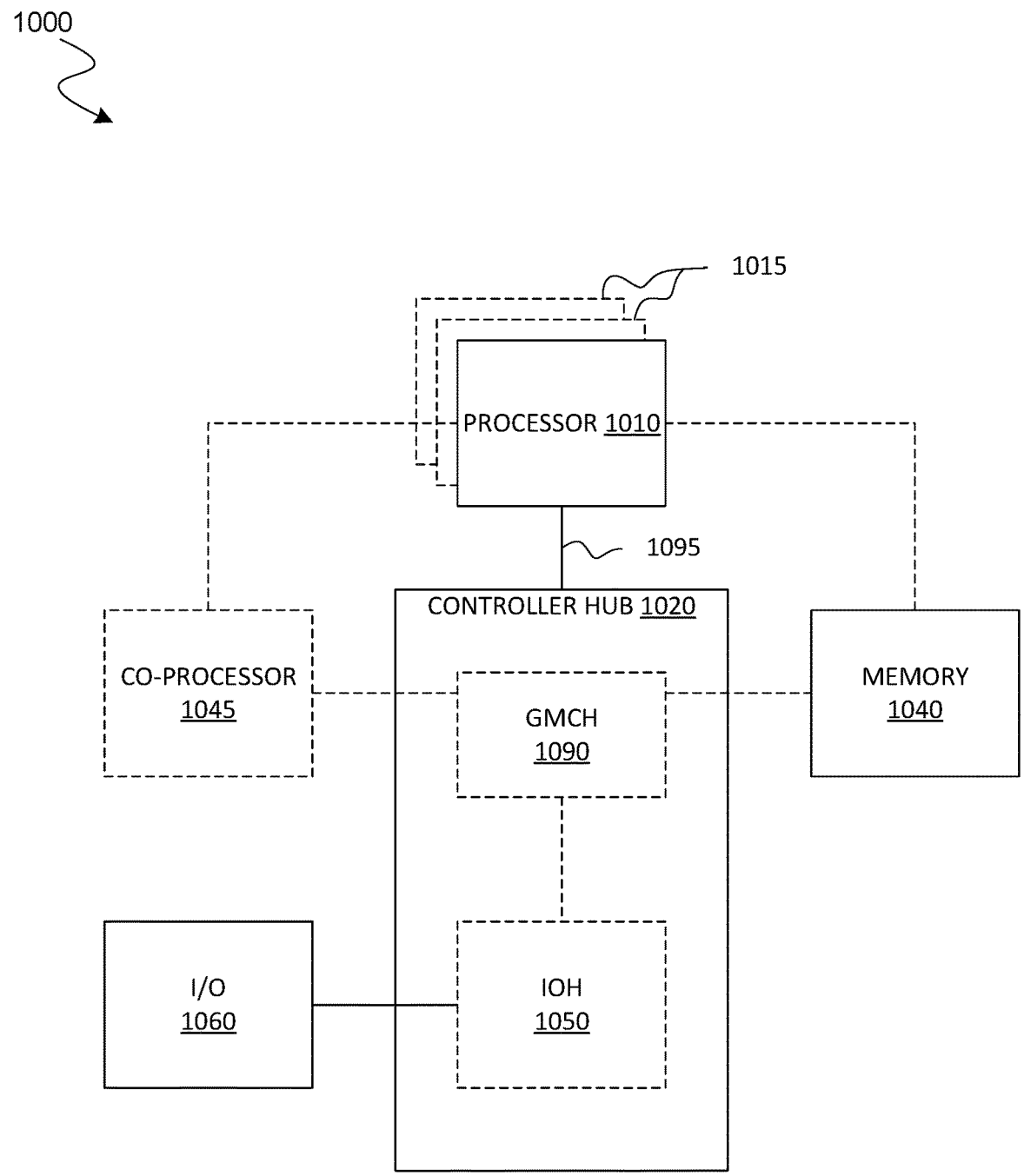
FIGS. 10 through 13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
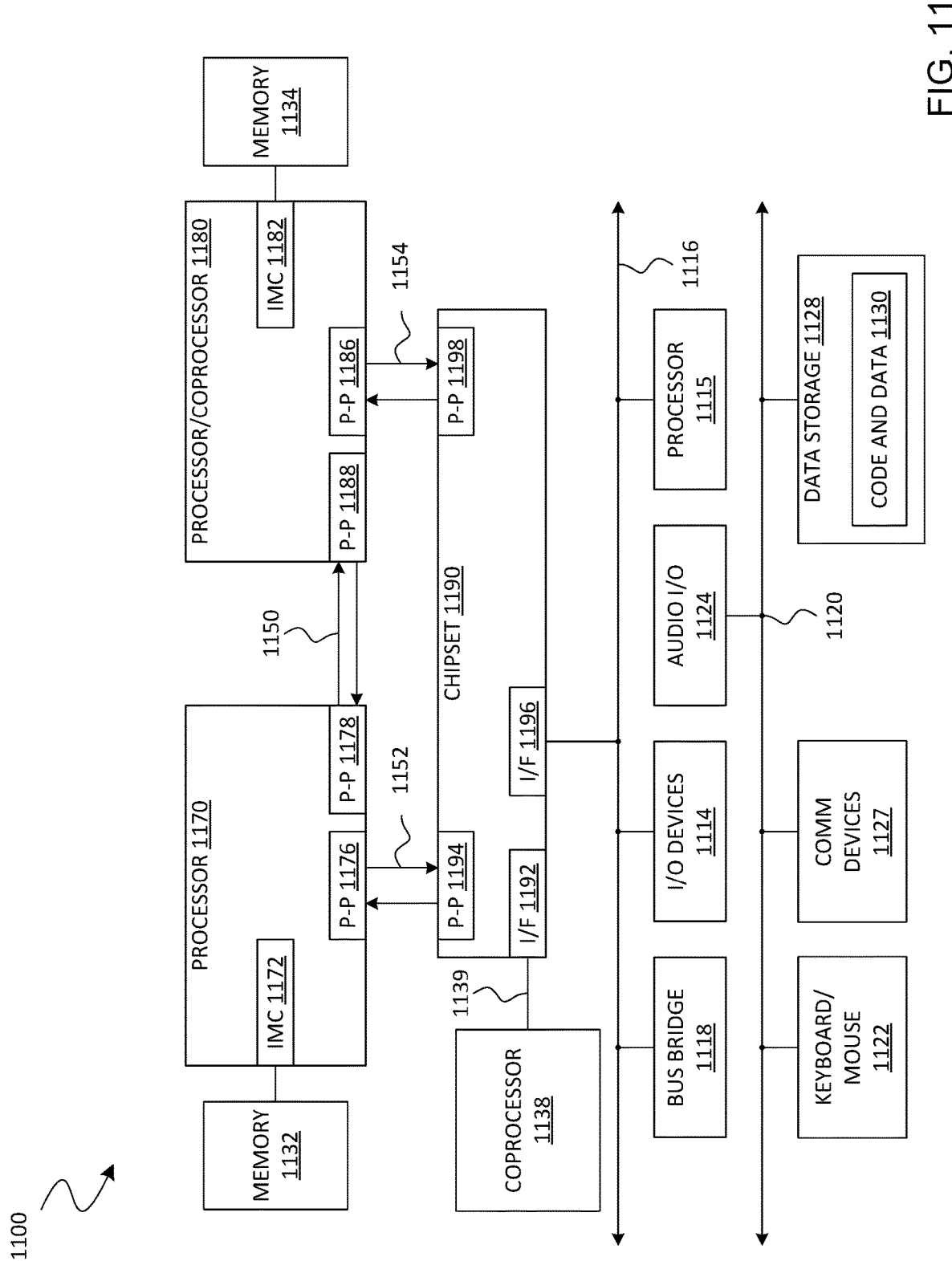

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller unit's point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192 and an interconnect 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
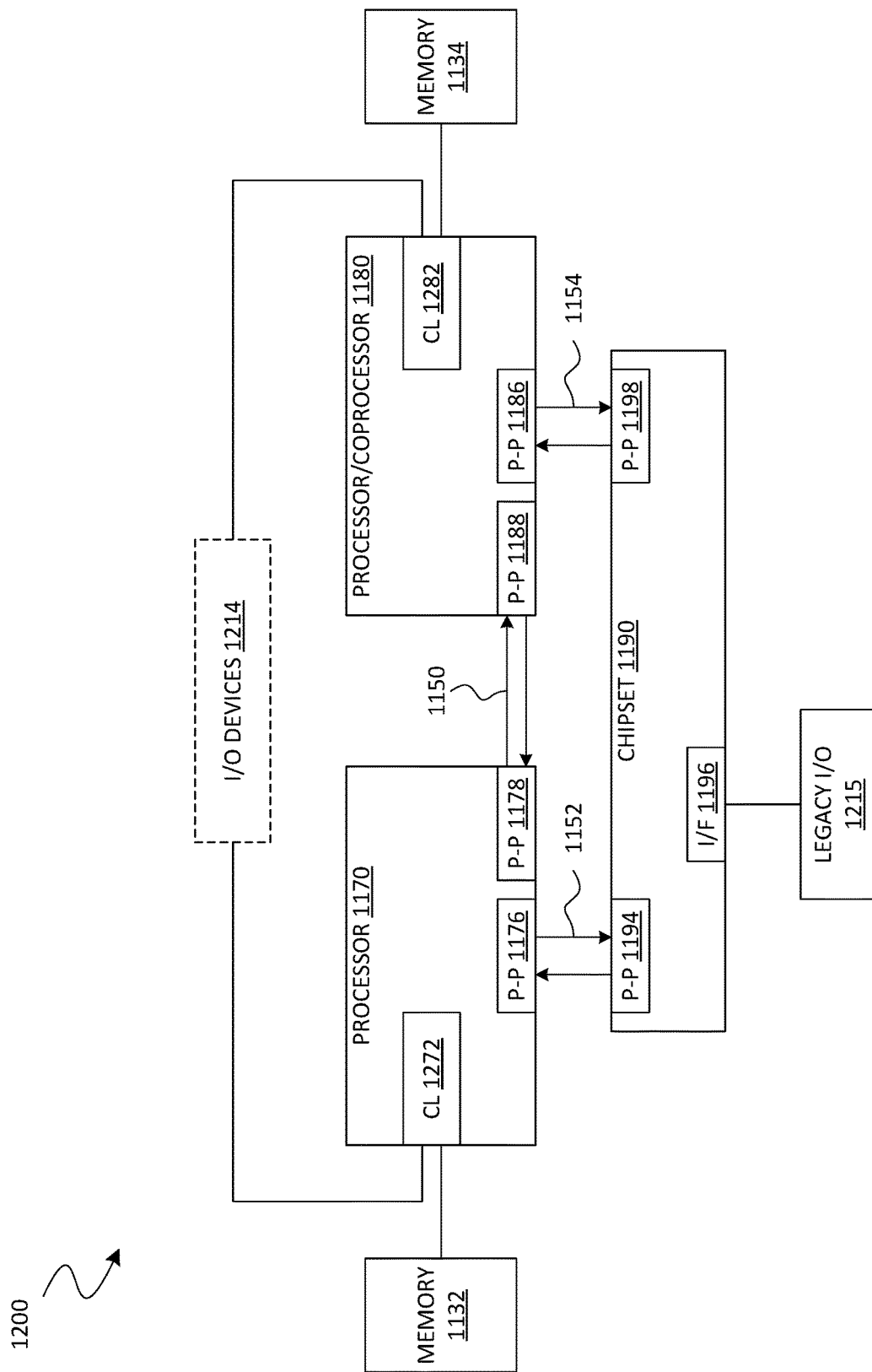

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the control logic 1272, 1282. Legacy I/O devices 1215 are coupled to the chipset 1190.

Figure 13:
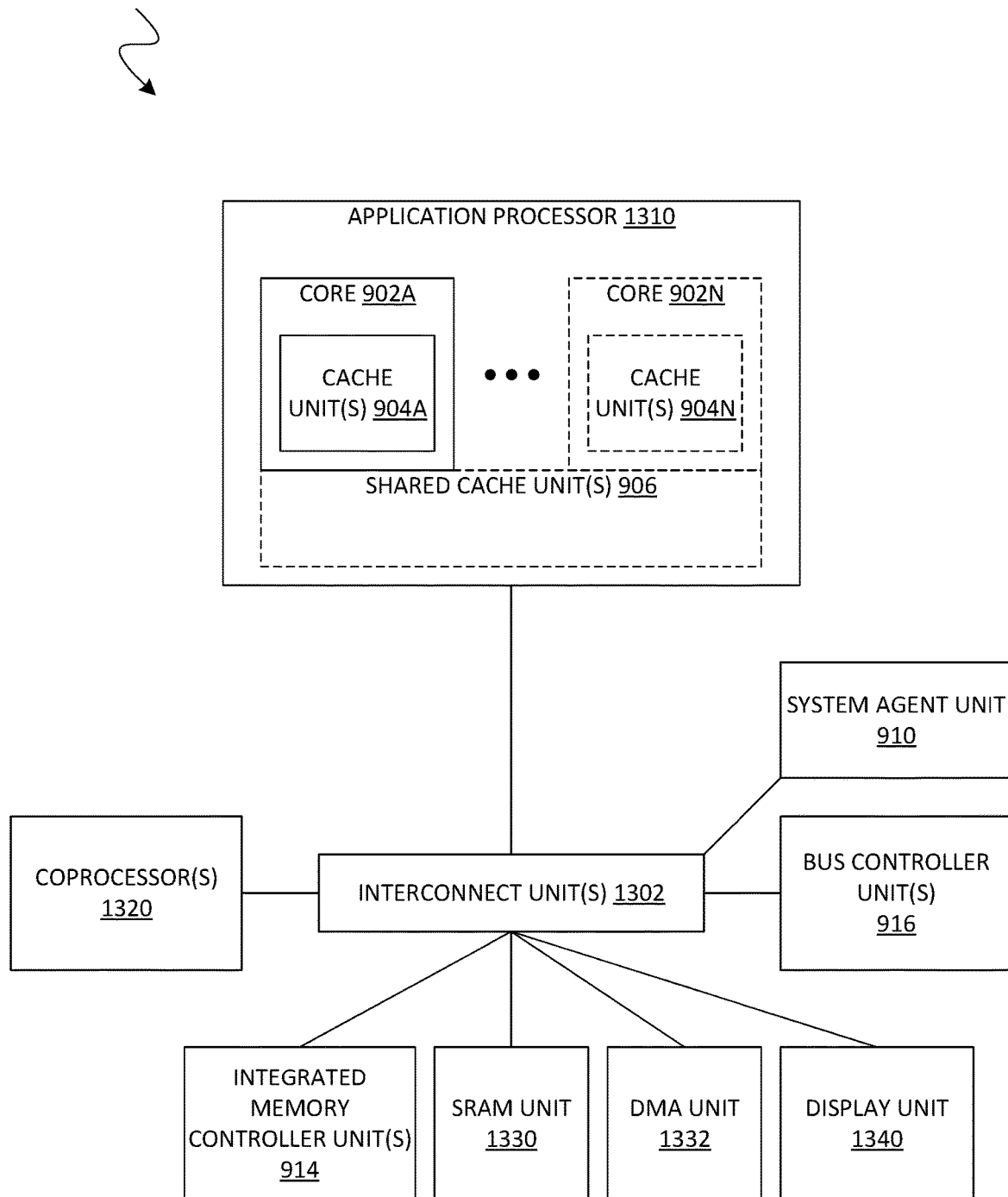

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
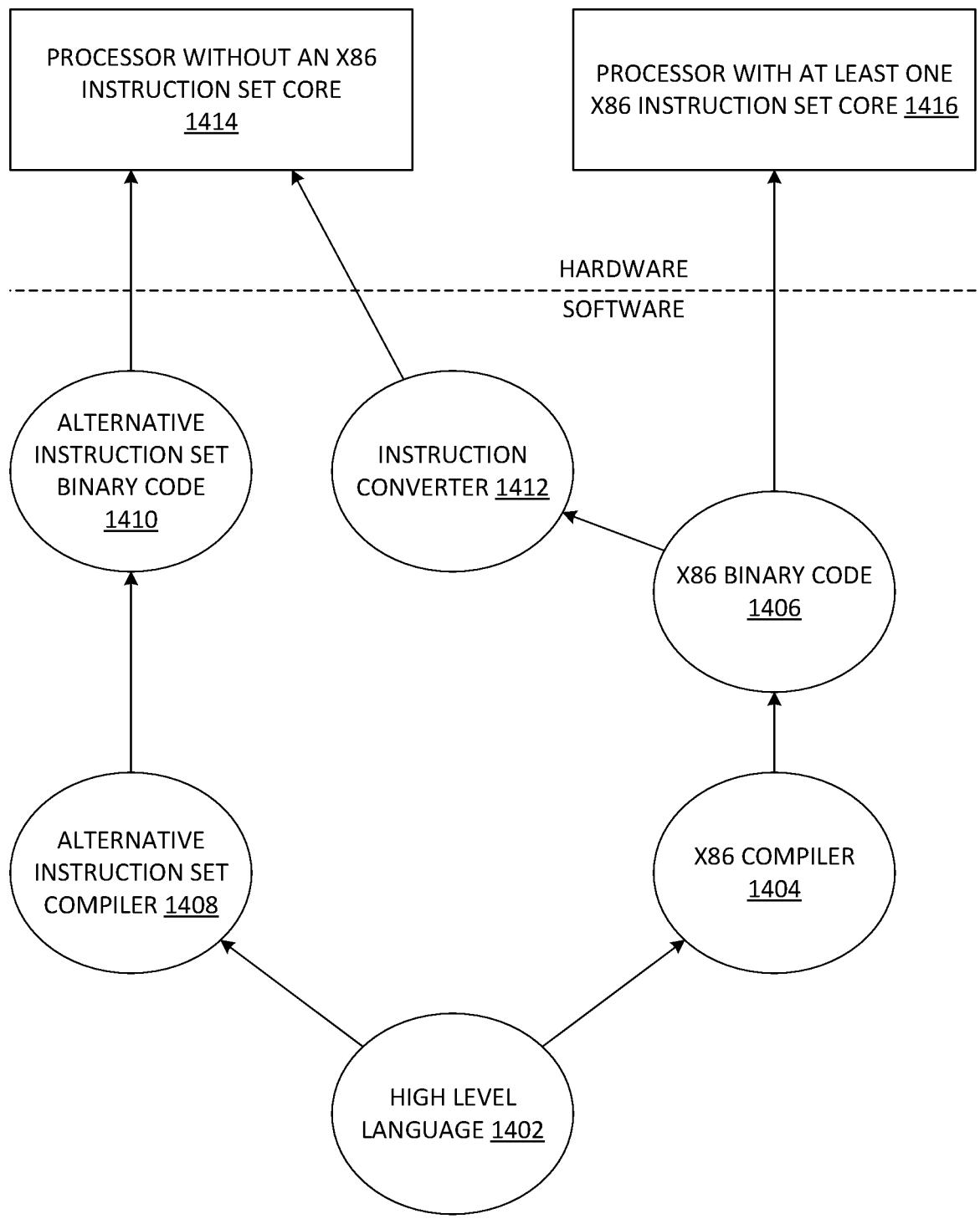
FIG. 14 is a block diagram contrasting the use of a software instruction converter to convert binary instructions in a source instruction set to binary instructions in a target instruction set according to embodiments.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

Techniques and architectures for providing access to a partitioned cache are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

In one or more first embodiments, a processor comprises a first one or more registers to provide first information which describes a set-wise partitioning of a cache, a second one or more registers to provide second information which describes a way-wise partitioning of the cache, and first circuitry coupled to the first one or more registers and the second one or more registers, the first circuitry to receive a memory access request comprising a first address, and identify a cache line of the cache based on the first address, the set-wise partitioning, and the way-wise partitioning.

In one or more second embodiments, further to the first embodiment, the first one or more registers comprise a first plurality of registers which correspond to different ones of multiple set-wise partitions, respectively, wherein the cache comprises multiple segments which each comprise a same total number of sets, and wherein, for each of the first plurality of registers, the register is to provide a respective first set of bits which is to identify one or more of the multiple segments as belonging to the corresponding set-wise partition.

In one or more third embodiments, further to the second embodiment, for each of the first plurality of registers, the register is to further provide a respective second set of bits which is to indicate a base of the corresponding set-wise partition.

In one or more fourth embodiments, further to the third embodiment, for each of the first plurality of registers, the register is to further provide a respective third set of bits to facilitate a selection of the corresponding set-wise partition.

In one or more fifth embodiments, further to the second embodiment, the first one or more registers further comprise a second plurality of registers which are each to correspond to a different respective one of the multiple set-wise partitions, and wherein, for each register of the second plurality of registers, the register is to identify one or more conditions to an authorization of an access to the corresponding set-wise partition.

In one or more sixth embodiments, further to the first embodiment or the second embodiment, for each set-wise partition of multiple set-wise partitions, the first one or more registers are to identify a respective plurality of addresses as corresponding to the set-wise partition.

In one or more seventh embodiments, further to the first embodiment or the second embodiment, the second one or more registers comprise a first register comprising multiple fields which correspond to different processor execution resources, respectively, and wherein, for each of the multiple fields, the field is to provide a value indicating one or more types of ways as being available to be allocated to the corresponding processor execution resource.

In one or more eighth embodiments, further to the seventh embodiment, the multiple fields comprise a first field which corresponds to one of a core, a thread, or a class of service.

In one or more ninth embodiments, further to the first embodiment or the second embodiment, the first circuitry to identify the cache line comprises the first circuitry to determine that the first address corresponds to a first set of a first set-wise partition, identify an offset between the first set and a first base of the first set-wise partition, detect an association of the memory access request with a second set-wise partition, and based on each of the association, the offset, and a second base of the second set-wise partition, identify a second set of the second set-wise partition.

In one or more tenth embodiments, a system comprises a processor comprising a first one or more registers to provide first information which describes a set-wise partitioning of a cache, a second one or more registers to provide second information which describes a way-wise partitioning of the cache, and first circuitry coupled to the first one or more registers and the second one or more registers, the first circuitry to receive a memory access request comprising a first address, and identify a cache line of the cache based on the first address, the set-wise partitioning, and the way-wise partitioning, and a memory coupled to the processor, the memory to store a set of instructions which are to be executed with the processor.

In one or more eleventh embodiments, further to the tenth embodiment, the first one or more registers comprise a first plurality of registers which correspond to different ones of multiple set-wise partitions, respectively, wherein the cache comprises multiple segments which each comprise a same total number of sets, and wherein, for each of the first plurality of registers, the register is to provide a respective first set of bits which is to identify one or more of the multiple segments as belonging to the corresponding set-wise partition.

In one or more twelfth embodiments, further to the eleventh embodiment, for each of the first plurality of registers, the register is to further provide a respective second set of bits which is to indicate a base of the corresponding set-wise partition.

In one or more thirteenth embodiments, further to the twelfth embodiment, for each of the first plurality of registers, the register is to further provide a respective third set of bits to facilitate a selection of the corresponding set-wise partition.

In one or more fourteenth embodiments, further to the eleventh embodiment, the first one or more registers further comprise a second plurality of registers which are each to correspond to a different respective one of the multiple set-wise partitions, and wherein, for each register of the second plurality of registers, the register is to identify one or more conditions to an authorization of an access to the corresponding set-wise partition.

In one or more fifteenth embodiments, further to the tenth embodiment or the eleventh embodiment, for each set-wise partition of multiple set-wise partitions, the first one or more registers are to identify a respective plurality of addresses as corresponding to the set-wise partition.

In one or more sixteenth embodiments, further to the tenth embodiment or the eleventh embodiment, the second one or more registers comprise a first register comprising multiple fields which correspond to different processor execution resources, respectively, and wherein, for each of the multiple fields, the field is to provide a value indicating one or more types of ways as being available to be allocated to the corresponding processor execution resource.

In one or more seventeenth embodiments, further to the sixteenth embodiment, the multiple fields comprise a first field which corresponds to one of a core, a thread, or a class of service.

In one or more eighteenth embodiments, further to the tenth embodiment or the eleventh embodiment, the first circuitry to identify the cache line comprises the first circuitry to determine that the first address corresponds to a first set of a first set-wise partition, identify an offset between the first set and a first base of the first set-wise partition, detect an association of the memory access request with a second set-wise partition, and based on each of the association, the offset, and a second base of the second set-wise partition, identify a second set of the second set-wise partition.

In one or more nineteenth embodiments, a method at a processor comprises accessing a first one or more registers to determine a set-wise partitioning of a cache, accessing a second one or more registers to determine a way-wise partitioning of the cache, receiving a memory access request comprising a first address, and identifying a cache line of the cache based on the first address, the set-wise partitioning, and the way-wise partitioning.

In one or more twentieth embodiments, further to the nineteenth embodiment, the first one or more registers comprise a first plurality of registers which correspond to different ones of multiple set-wise partitions, respectively, wherein the cache comprises multiple segments which each comprise a same total number of sets, and wherein, for each of the first plurality of registers, the register is to provide a respective first set of bits which is to identify one or more of the multiple segments as belonging to the corresponding set-wise partition.

In one or more twenty-first embodiments, further to the twentieth embodiment, for each of the first plurality of registers, the register is to further provide a respective second set of bits which is to indicate a base of the corresponding set-wise partition.

In one or more twenty-second embodiments, further to the twenty-first embodiment, for each of the first plurality of registers, the register is to further provide a respective third set of bits to facilitate a selection of the corresponding set-wise partition.

In one or more twenty-third embodiments, further to the twentieth embodiment, the first one or more registers further comprise a second plurality of registers which are each to correspond to a different respective one of the multiple set-wise partitions, and wherein, for each register of the second plurality of registers, the register is to identify one or more conditions to an authorization of an access to the corresponding set-wise partition.

In one or more twenty-fourth embodiments, further to the nineteenth embodiment or the twentieth embodiment, for each set-wise partition of multiple set-wise partitions, the first one or more registers are to identify a respective plurality of addresses as corresponding to the set-wise partition.

In one or more twenty-fifth embodiments, further to the nineteenth embodiment or the twentieth embodiment, the second one or more registers comprise a first register comprising multiple fields which correspond to different processor execution resources, respectively, and wherein, for each of the multiple fields, the field is to provide a value indicating one or more types of ways as being available to be allocated to the corresponding processor execution resource.

In one or more twenty-sixth embodiments, further to the twenty-fifth embodiment, the multiple fields comprise a first field which corresponds to one of a core, a thread, or a class of service.

In one or more twenty-seventh embodiments, further to the nineteenth embodiment or the twentieth embodiment, identifying the cache line comprises determining that the first address corresponds to a first set of a first set-wise partition, identifying an offset between the first set and a first base of the first set-wise partition, detecting an association of the memory access request with a second set-wise partition, and based on each of the association, the offset, and a second base of the second set-wise partition, identifying a second set of the second set-wise partition.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
 a first one or more registers to provide first information which describes a set-wise partitioning of a cache;
 a second one or more registers to provide second information which describes a way-wise partitioning of the cache; and
 first circuitry coupled to the first one or more registers and the second one or more registers, the first circuitry to:
  receive a memory access request comprising a first address; and
  identify a cache line of the cache based on the first address, the set-wise
 partitioning, and the way-wise partitioning;
 wherein:
  the first one or more registers comprise a first plurality of registers which correspond to different ones of multiple set-wise partitions, respectively;
  the cache comprises multiple segments which each comprise a same total number of sets; and
  for each of the first plurality of registers, the register is to provide a respective first set of bits which is to identify one or more of the multiple segments as belonging to the corresponding set-wise partition.

2. The processor of claim 1, wherein, for each of the first plurality of registers, the register is to further provide a respective second set of bits which is to indicate a base of the corresponding set-wise partition.

3. The processor of claim 2, wherein, for each of the first plurality of registers, the register is to further provide a respective third set of bits to facilitate a selection of the corresponding set-wise partition.

4. The processor of claim 1, wherein the first one or more registers further comprise a second plurality of registers which are each to correspond to a different respective one of the multiple set-wise partitions; and wherein, for each register of the second plurality of registers, the register is to identify one or more conditions to an authorization of an access to the corresponding set-wise partition.

5. The processor of claim 1, wherein, for each set-wise partition of multiple set-wise partitions, the first one or more registers are to identify a respective plurality of addresses as corresponding to the set-wise partition.

6. The processor of claim 1, wherein the second one or more registers comprise a first register comprising multiple fields which correspond to different processor execution resources, respectively; and wherein, for each of the multiple fields, the field is to provide a value indicating one or more types of ways as being available to be allocated to the corresponding processor execution resource.

7. The processor of claim 6, wherein the multiple fields comprise a first field which corresponds to one of a core, a thread, or a class of service.

8. The processor of claim 1, wherein the first circuitry to identify the cache line comprises the first circuitry to:

determine that the first address corresponds to a first set of a first set-wise partition;
identify an offset between the first set and a first base of the first set-wise partition;
detect an association of the memory access request with a second set-wise partition; and
based on each of the association, the offset, and a second base of the second set-wise partition, identify a second set of the second set-wise partition.

9. A system comprising:
a processor comprising:
a first one or more registers to provide first information which describes a set-wise partitioning of a cache;
a second one or more registers to provide second information which describes a way-wise partitioning of the cache; and
first circuitry coupled to the first one or more registers and the second one or more registers, the first circuitry to:
receive a memory access request comprising a first address; and
identify a cache line of the cache based on the first address, the set-wise partitioning, and the way-wise partitioning;
wherein:
the first one or more registers comprise a first plurality of registers which correspond to different ones of multiple set-wise partitions, respectively;
the cache comprises multiple segments which each comprise a same total number of sets; and
for each of the first plurality of registers, the register is to provide a respective first set of bits which is to identify one or more of the multiple segments as belonging to the corresponding set-wise partition; and
a memory coupled to the processor, the memory to store a set of instructions which are to be executed with the processor.

10. The system of claim 9, wherein, for each of the first plurality of registers, the register is to further provide a respective second set of bits which is to indicate a base of the corresponding set-wise partition.

11. The system of claim 9, wherein, for each set-wise partition of multiple set-wise partitions, the first one or more registers are to identify a respective plurality of addresses as corresponding to the set-wise partition.

12. The system of claim 9, wherein the second one or more registers comprise a first register comprising multiple fields which correspond to different processor execution resources, respectively; and wherein, for each of the multiple fields, the field is to provide a value indicating one or more types of ways as being available to be allocated to the corresponding processor execution resource.

13. The system of claim 9, wherein the first circuitry to identify the cache line comprises the first circuitry to:

determine that the first address corresponds to a first set of a first set-wise partition;
identify an offset between the first set and a first base of the first set-wise partition;
detect an association of the memory access request with a second set-wise partition; and
based on each of the association, the offset, and a second base of the second set-wise partition, identify a second set of the second set-wise partition.

14. A method at a processor, the method comprising:
accessing a first one or more registers to determine a set-wise partitioning of a cache;
accessing a second one or more registers to determine a way-wise partitioning of the cache;
receiving a memory access request comprising a first address; and
identifying a cache line of the cache based on the first address, the set-wise partitioning, and the way-wise partitioning;
wherein:
the first one or more registers comprise a first plurality of registers which correspond to different ones of multiple set-wise partitions, respectively;
the cache comprises multiple segments which each comprise a same total number of sets; and
for each of the first plurality of registers, the register is to provide a respective first set of bits which is to identify one or more of the multiple segments as belonging to the corresponding set-wise partition.

15. The method of claim 14, wherein, for each set-wise partition of multiple set-wise partitions, the first one or more registers are to identify a respective plurality of addresses as corresponding to the set-wise partition.

16. The method of claim 14, wherein the second one or more registers comprise a first register comprising multiple fields which correspond to different processor execution resources, respectively; and wherein, for each of the multiple fields, the field is to provide a value indicating one or more types of ways as being available to be allocated to the corresponding processor execution resource.

17. The method of claim 14, wherein identifying the cache line comprises:

determining that the first address corresponds to a first set of a first set-wise partition;
identifying an offset between the first set and a first base of the first set-wise partition;
detecting an association of the memory access request with a second set-wise partition; and
based on each of the association, the offset, and a second base of the second set-wise partition, identifying a second set of the second set-wise partition.

* * * * *